US012682183B2

(12) United States Patent
Chandarana et al.

(10) Patent No.: US 12,682,183 B2
(45) Date of Patent: Jul. 14, 2026

(54) METHODS, SYSTEMS, APPARATUSES, AND DEVICES FOR FACILITATING CONVERSATIONAL INTERACTION WITH USERS TO HELP THE USERS

(71) Applicant: Next League Executive Board LLC, Phoenix, AZ (US)

(72) Inventors: Namaswi Chandarana, Hoboken, NJ (US); Tina Gada, Irving, TX (US); Ankit Virmani, Lynnwood, WA (US); Ranjeet Mudholkar, Phoenix, AZ (US)

(73) Assignee: Next League Executive Board LLC, Phoenix, AZ (US)

( * ) Notice: Subject to any disclaimer, the term of this patent is extended or adjusted under 35 U.S.C. 154(b) by 126 days.

(21) Appl. No.: 18/784,961

(22) Filed: Jul. 26, 2024

(65) Prior Publication Data

US 2025/0363311 A1 Nov. 27, 2025

Related U.S. Application Data

(63) Continuation-in-part of application No. 18/674,885, filed on May 26, 2024, now abandoned.

(51) Int. Cl.
*G06F 40/40* (2020.01)
*G06Q 50/26* (2024.01)

(52) U.S. Cl.
CPC ............. *G06F 40/40* (2020.01); *G06Q 50/26* (2013.01)

(58) Field of Classification Search
CPC ... G10L 15/22; G10L 15/07; G10L 2015/223; G06F 40/40; G06Q 50/26
See application file for complete search history.

(56) References Cited

U.S. PATENT DOCUMENTS 6,266,664 B1 * 7/2001 Russell-Falla ...... G06F 16/9535
707/999.005
8,447,602 B2 * 5/2013 Bartosik ............... G06F 40/232
704/235

(Continued)

FOREIGN PATENT DOCUMENTS

AU 2011255614 A1 * 11/2012 ....... G06F 16/24578
AU 2014233517 A1 * 9/2015 ............. G10L 15/22

(Continued)

OTHER PUBLICATIONS

Jose António Moinhos Cordeiro et al., Towards a Human Oriented Approach to Information Systems Development, Jul. 2009, Conference: I-West 2009At: Sofia, Bulgaria, https://www.researchgate.net/publication/301672082_Towards_a_Human_Oriented_Approach_to_Information_Systems_Development.

(Continued)

*Primary Examiner* — Mohammad K Islam
(74) *Attorney, Agent, or Firm* — Dhiraj Jindal; PATENT YOGI LLC

(57) ABSTRACT

A method for facilitating conversational interaction with users to help the users includes transmitting a conversational interaction interface for conversationally interacting with a user to a user device, receiving a request of the user through the conversational interaction interface from the user device, identifying an information based on the request, generating an input comprising the request and the information for a machine learning model based on the request and the information, processing the input using the machine learning model, generating a response for the request based on the processing of the input, transmitting the response through the conversational interaction interface for conversationally interacting with the user to the user device, and storing the machine learning model, the request, and the response.

18 Claims, 22 Drawing Sheets

(56) References Cited

U.S. PATENT DOCUMENTS

| | | | | |
|---|---|---|---|---|
| 9,619,735 B1 * | 4/2017 | Lineback | ............. | G06N 3/0464 |
| 10,565,498 B1 * | 2/2020 | Zhiyanov | ............. | G06F 40/284 |
| 10,853,579 B2 * | 12/2020 | Laxman | ................. | G06N 3/006 |
| 10,878,174 B1 * | 12/2020 | Vontobel | .......... | G06Q 10/06398 |
| 11,106,690 B1 * | 8/2021 | Dhillon | ............... | G06F 16/2468 |
| 11,481,434 B1 * | 10/2022 | Venti | ....................... | G06F 40/30 |
| 11,532,301 B1 * | 12/2022 | Hajebi | .................... | G06F 40/35 |
| 2003/0115191 A1 * | 6/2003 | Copperman | ...... | G06F 16/90332 |
| | | | | 707/E17.139 |
| 2012/0215776 A1 * | 8/2012 | Guha | .................... | G06F 16/951 |
| | | | | 707/E17.064 |
| 2014/0272821 A1 * | 9/2014 | Pitschel | .................. | G06F 40/58 |
| | | | | 434/157 |
| 2015/0278341 A1 * | 10/2015 | Shen | ................... | G06F 16/9538 |
| | | | | 707/730 |
| 2016/0323398 A1 * | 11/2016 | Guo | ....................... | H04L 67/535 |
| 2017/0127016 A1 * | 5/2017 | Yu | ........................... | G06N 3/084 |
| 2017/0323636 A1 * | 11/2017 | Xiao | ....................... | G06F 40/30 |
| 2018/0077101 A1 * | 3/2018 | Desouza Sana | ..... | G06Q 10/107 |
| 2019/0108228 A1 * | 4/2019 | Zeng | ................. | G06F 16/24522 |
| 2020/0118544 A1 * | 4/2020 | Lee | ........................ | G10L 15/063 |
| 2020/0356653 A1 * | 11/2020 | Cho | ......................... | G06F 21/36 |
| 2021/0201351 A1 * | 7/2021 | Nag | ......................... | G06N 3/08 |
| 2022/0366901 A1 * | 11/2022 | Rathaur | ................ | G06F 16/245 |
| 2023/0134791 A1 * | 5/2023 | Londeree | ................ | G06F 16/93 |
| | | | | 706/50 |
| 2025/0086213 A1 * | 3/2025 | Dilipkumar | ....... | G06F 16/24522 |
| 2025/0190710 A1 * | 6/2025 | Arthur | .................. | G06F 16/243 |
| 2025/0272279 A1 * | 8/2025 | Kshirsagar | ............ | G06F 16/252 |

FOREIGN PATENT DOCUMENTS

| | | | | | |
|---|---|---|---|---|---|
| AU | 2015210460 A1 * | 9/2015 | ........... | G10L 15/183 |
| CN | 110998565 A * | 4/2020 | ............... | G06N 3/08 |
| EP | 3514694 B1 * | 12/2022 | .......... | G06F 40/253 |
| EP | 4312147 A2 * | 1/2024 | .......... | G10L 15/197 |
| EP | 4571587 A1 * | 6/2025 | ............ | G06F 40/40 |
| WO | WO-2013157603 A1 * | 10/2013 | .......... | G06F 16/955 |
| WO | WO-2015039165 A1 * | 3/2015 | ....... | G06F 16/24578 |
| WO | WO-2017160341 A1 * | 9/2017 | ............. | G10L 15/22 |
| WO | WO-2021119064 A1 * | 6/2021 | .............. | G06N 3/09 |
| WO | WO-2023017320 A1 * | 2/2023 | ............. | G10L 15/22 |
| WO | WO-2025184238 A1 * | 9/2025 | ....... | G06F 16/90332 |

OTHER PUBLICATIONS

Adam Akers et al., Visual Color Perception in Green Exercise: Positive Effects on Mood and Perceived Exertion, Aug. 2, 2012, ACS Publications, https://pubs.acs.org/doi/10.1021/es301685g.
Apple Developer, Swift, https://developer.apple.com/swift/.
Apple Developer, Introducing SwiftUI, https://developer.apple.com/tutorials/swiftui.
The Composable Architecture, Point-Free Inc, GitHub, https://github.com/pointfreeco/swift-composable-architecture.
Apple Developer, Keychain services, https://developer.apple.com/documentation/security/keychain_services/.
Yoandre Saavedra Gonzalez, How to handle rate limits, GitHub, https://github.com/openai/openai-cookbook/blob/main/examples/How_to_handle_rate_limits.ipynb.
MySQL Tutorial, W3Schools, https://www.w3schools.com/MySQL/default.asp.
Assistants API Overview, OpenAI Platform, https://platform.openai.com/docs/assistants/overview.
Web Hosting. Information about server hosting and configurations, Hostinger, https://www.hostinger.com/web-hosting.
Open Source Edge: Secure & Fast, Ubuntu, https://ubuntu.com/.
Why is HTTP not secure? | HTTP vs. HTTPS, Cloudflare Inc., https://www.cloudflare.com/en-gb/learning/ssl/why-is-http-not-secure/.
Configuring HTTPS servers, Nginx, https://nginx.org/en/docs/http/configuring_https_servers.html.
Client-Side Rate Limiting, Memfault Inc, https://docs.memfault.com/docs/android/android-rate-limiting.
Taha Sufiyan, What Is Node.js? A Complete Guide for Developers, Jul. 9, 2024, https://www.simplilearn.com/tutorials/nodejs-tutorial/what-is-nodejs.
What Is an API Key?, Fortinet Inc., https://www.fortinet.com/resources/cyberglossary/api-key.
Executive Order on the Safe, Secure, and Trustworthy Development and Use of Artificial Intelligence, Oct. 30, 2023, The White House, https://www.whitehouse.gov/briefing-room/presidential-actions/2023/10/30/executive-order-on-the-safe-secure-and-trustworthy-development-and-use-of-artificial-intelligence/.

* cited by examiner

- A CONVERSATIONAL
  INTERACTION INTERFACE
- AT LEAST ONE REQUEST
- AT LEAST ONE RESPONSE

300

302

ANALYZING, USING THE PROCESSING DEVICE, THE AT LEAST ONE OUTPUT

304

MODIFYING, USING THE PROCESSING DEVICE, THE AT LEAST ONE OUTPUT BY INCORPORATING AT LEAST ONE MODIFICATION IN THE AT LEAST ONE OUTPUT BASED ON THE ANALYZING OF THE AT LEAST ONE OUTPUT, WHEREIN THE GENERATING OF THE AT LEAST ONE RESPONSE IS FURTHER BASED ON THE MODIFYING OF THE AT LEAST ONE OUTPUT

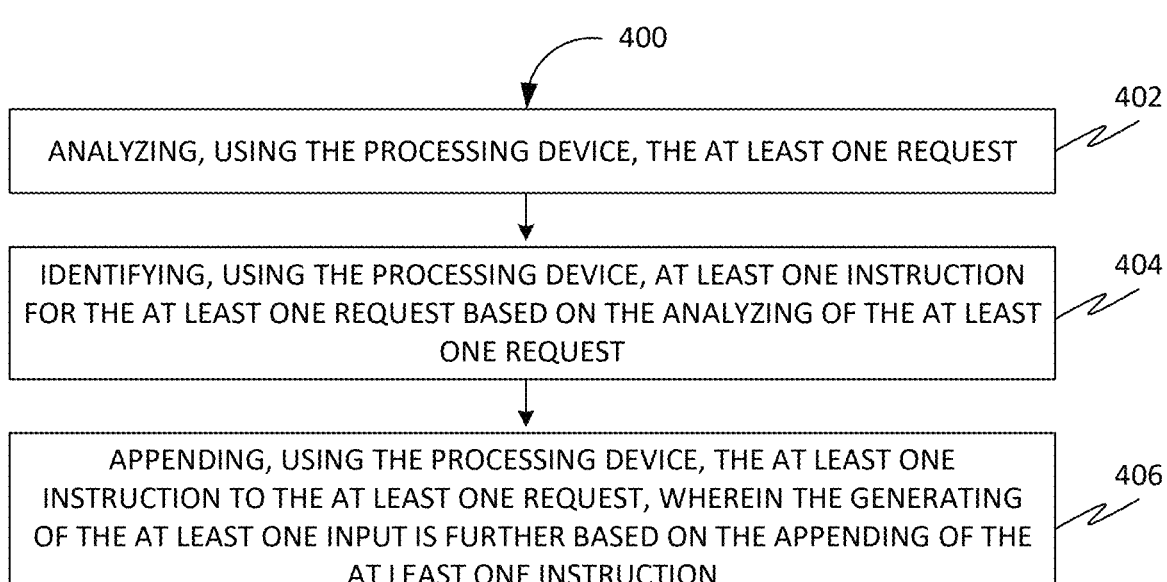

400

ANALYZING, USING THE PROCESSING DEVICE, THE AT LEAST ONE REQUEST

402

IDENTIFYING, USING THE PROCESSING DEVICE, AT LEAST ONE INSTRUCTION FOR THE AT LEAST ONE REQUEST BASED ON THE ANALYZING OF THE AT LEAST ONE REQUEST

404

APPENDING, USING THE PROCESSING DEVICE, THE AT LEAST ONE INSTRUCTION TO THE AT LEAST ONE REQUEST, WHEREIN THE GENERATING OF THE AT LEAST ONE INPUT IS FURTHER BASED ON THE APPENDING OF THE AT LEAST ONE INSTRUCTION

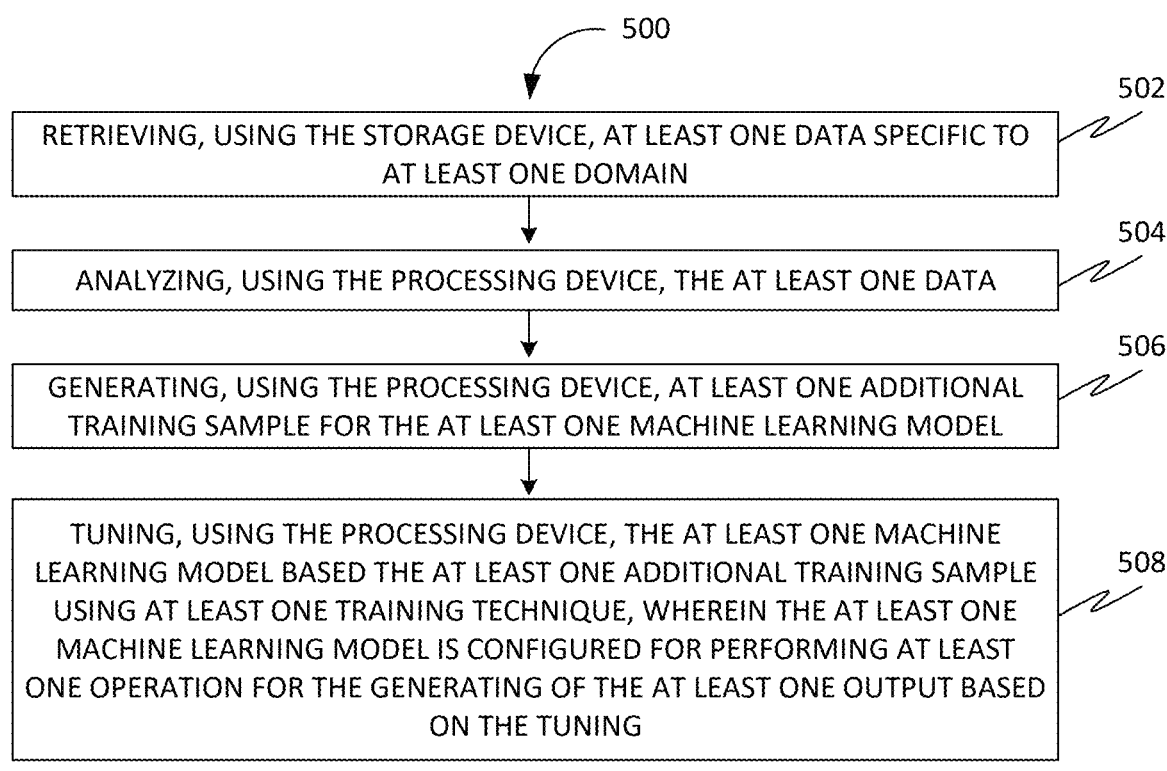

500

502

RETRIEVING, USING THE STORAGE DEVICE, AT LEAST ONE DATA SPECIFIC TO AT LEAST ONE DOMAIN

504

ANALYZING, USING THE PROCESSING DEVICE, THE AT LEAST ONE DATA

506

GENERATING, USING THE PROCESSING DEVICE, AT LEAST ONE ADDITIONAL TRAINING SAMPLE FOR THE AT LEAST ONE MACHINE LEARNING MODEL

508

TUNING, USING THE PROCESSING DEVICE, THE AT LEAST ONE MACHINE LEARNING MODEL BASED THE AT LEAST ONE ADDITIONAL TRAINING SAMPLE USING AT LEAST ONE TRAINING TECHNIQUE, WHEREIN THE AT LEAST ONE MACHINE LEARNING MODEL IS CONFIGURED FOR PERFORMING AT LEAST ONE OPERATION FOR THE GENERATING OF THE AT LEAST ONE OUTPUT BASED ON THE TUNING

FIG. 5

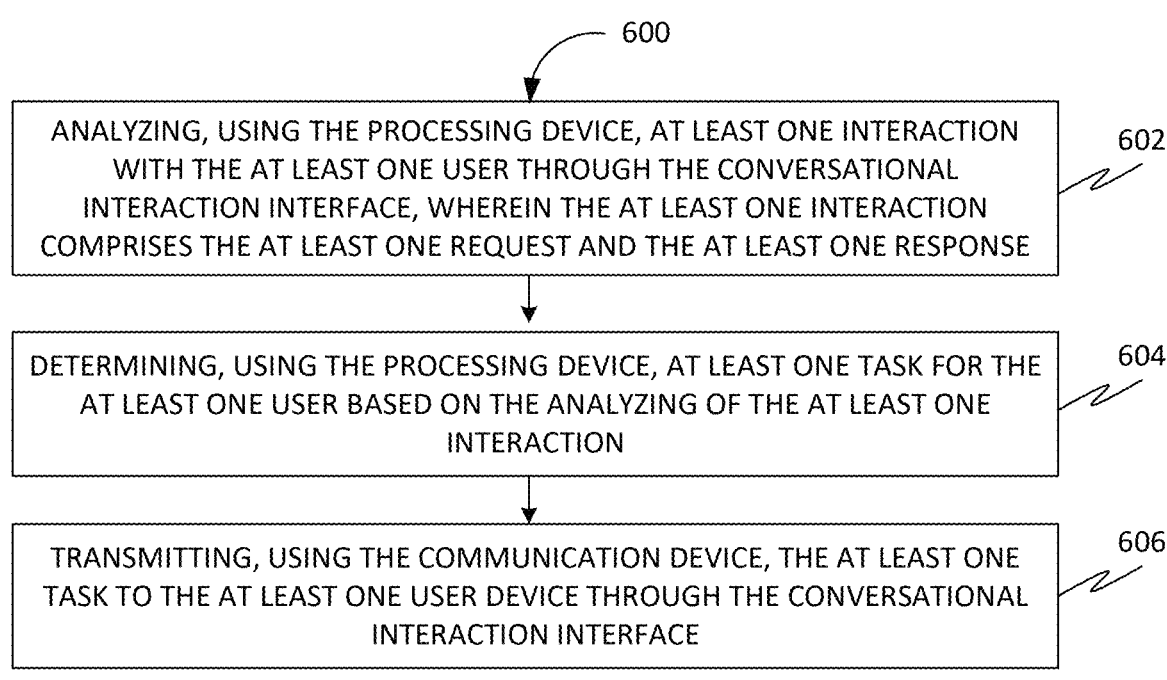

ANALYZING, USING THE PROCESSING DEVICE, AT LEAST ONE INTERACTION WITH THE AT LEAST ONE USER THROUGH THE CONVERSATIONAL INTERACTION INTERFACE, WHEREIN THE AT LEAST ONE INTERACTION COMPRISES THE AT LEAST ONE REQUEST AND THE AT LEAST ONE RESPONSE — 602

DETERMINING, USING THE PROCESSING DEVICE, AT LEAST ONE TASK FOR THE AT LEAST ONE USER BASED ON THE ANALYZING OF THE AT LEAST ONE INTERACTION — 604

TRANSMITTING, USING THE COMMUNICATION DEVICE, THE AT LEAST ONE TASK TO THE AT LEAST ONE USER DEVICE THROUGH THE CONVERSATIONAL INTERACTION INTERFACE — 606

FIG. 6

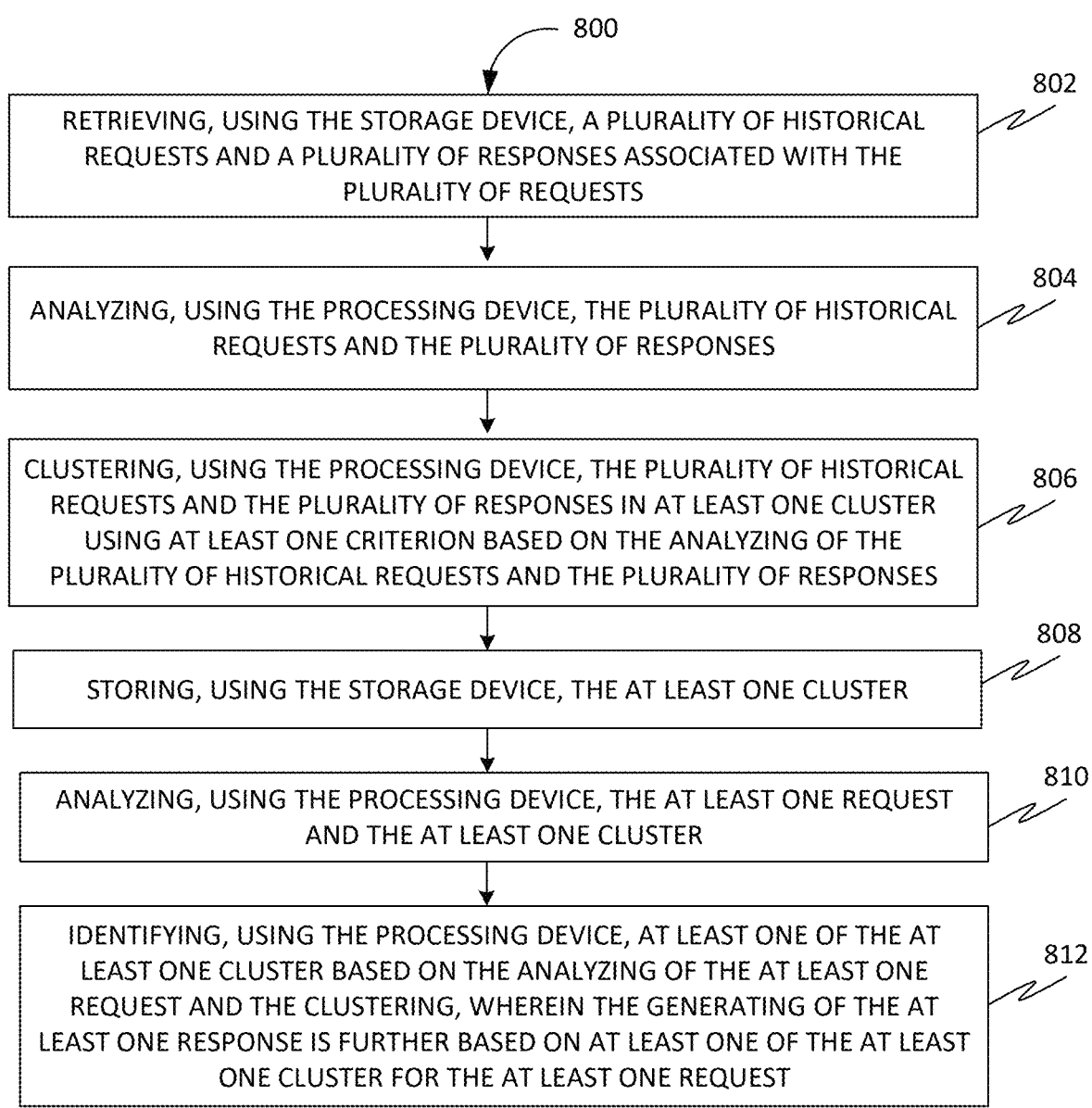

800

802

RETRIEVING, USING THE STORAGE DEVICE, A PLURALITY OF HISTORICAL REQUESTS AND A PLURALITY OF RESPONSES ASSOCIATED WITH THE PLURALITY OF REQUESTS

804

ANALYZING, USING THE PROCESSING DEVICE, THE PLURALITY OF HISTORICAL REQUESTS AND THE PLURALITY OF RESPONSES

806

CLUSTERING, USING THE PROCESSING DEVICE, THE PLURALITY OF HISTORICAL REQUESTS AND THE PLURALITY OF RESPONSES IN AT LEAST ONE CLUSTER USING AT LEAST ONE CRITERION BASED ON THE ANALYZING OF THE PLURALITY OF HISTORICAL REQUESTS AND THE PLURALITY OF RESPONSES

808

STORING, USING THE STORAGE DEVICE, THE AT LEAST ONE CLUSTER

810

ANALYZING, USING THE PROCESSING DEVICE, THE AT LEAST ONE REQUEST AND THE AT LEAST ONE CLUSTER

812

IDENTIFYING, USING THE PROCESSING DEVICE, AT LEAST ONE OF THE AT LEAST ONE CLUSTER BASED ON THE ANALYZING OF THE AT LEAST ONE REQUEST AND THE CLUSTERING, WHEREIN THE GENERATING OF THE AT LEAST ONE RESPONSE IS FURTHER BASED ON AT LEAST ONE OF THE AT LEAST ONE CLUSTER FOR THE AT LEAST ONE REQUEST

FIG. 8

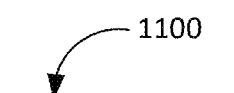
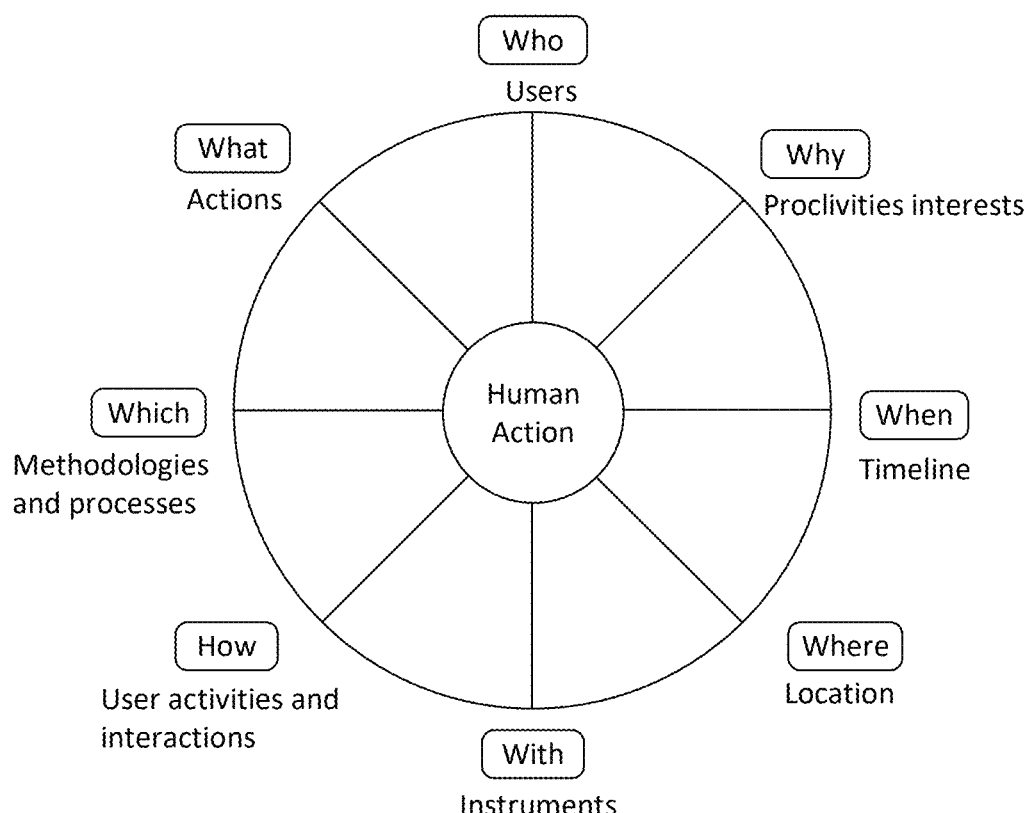
FIG. 11

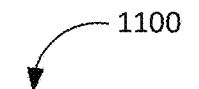
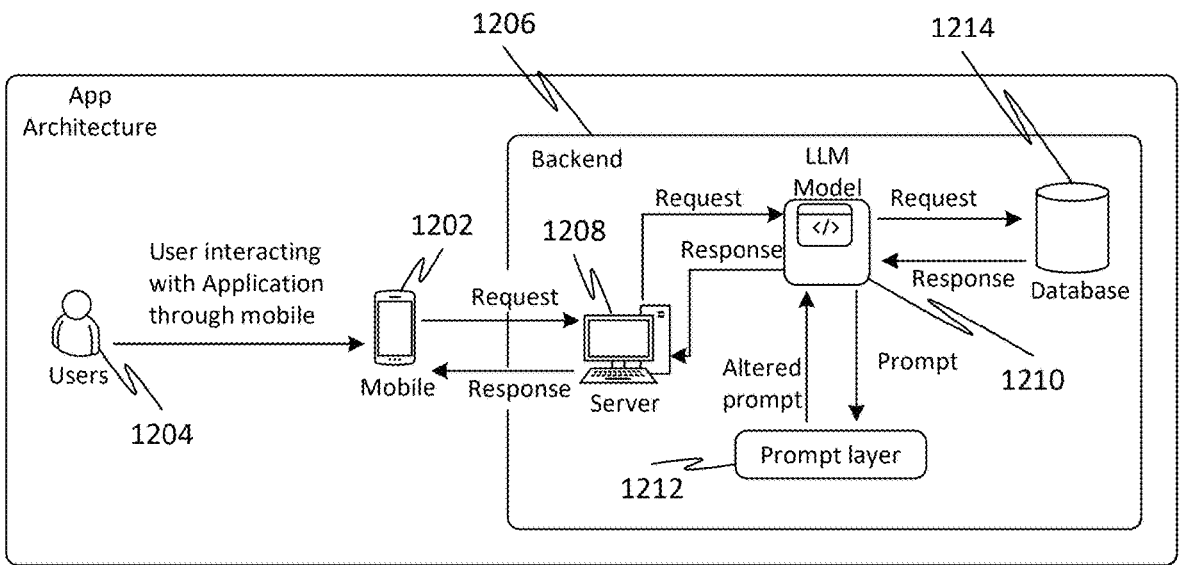
FIG. 12

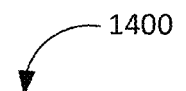
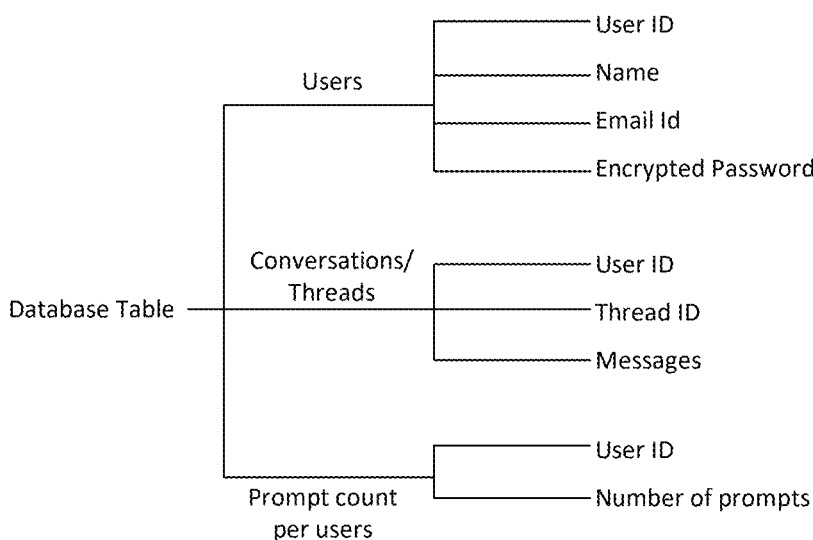
FIG. 14

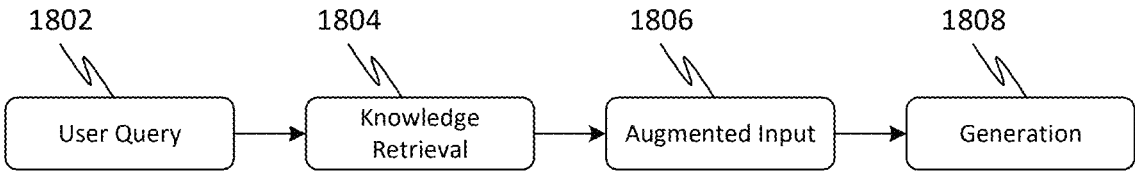
1802       1804       1806       1808
User Query → Knowledge Retrieval → Augmented Input → Generation
FIG. 18

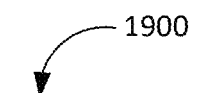
1900
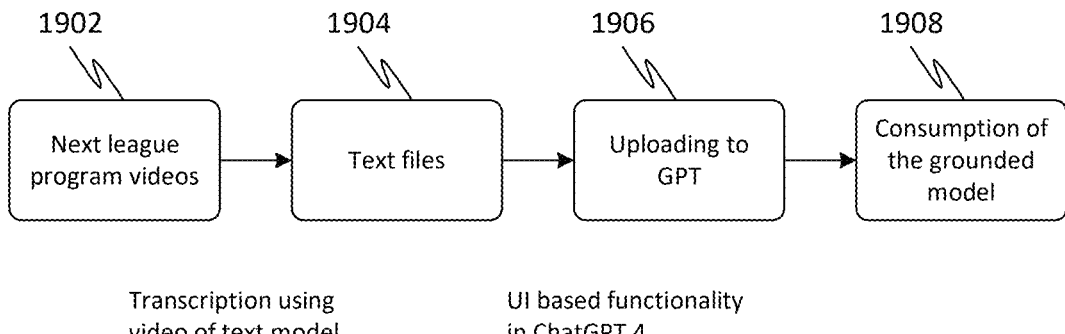
1902
Next league
program videos
1904
Text files
1906
Uploading to
GPT
1908
Consumption of
the grounded
model
Transcription using
video of text model
UI based functionality
in ChatGPT 4
FIG. 19

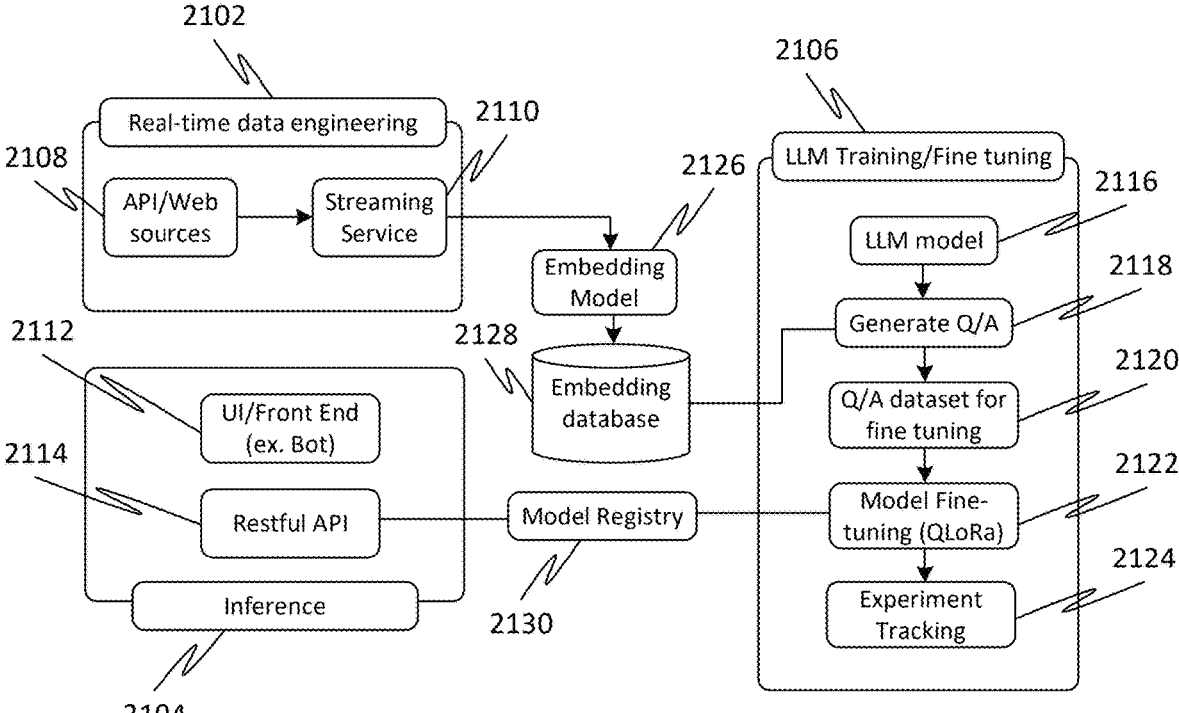
FIG. 21

METHODS, SYSTEMS, APPARATUSES, AND DEVICES FOR FACILITATING CONVERSATIONAL INTERACTION WITH USERS TO HELP THE USERS

REFERENCE TO RELATED APPLICATIONS

This application is a continuation-in-part of the pending U.S. patent application Ser. No. 18/674,885, titled "Intelligent Conversational System for Personalized EB-1A Guidance and Self-Discovery using AI", filed on May 26, 2024, which is incorporated by reference herein in its entirety.

FIELD OF THE INVENTION

Generally, the present disclosure relates to the field of data processing. More specifically, the present disclosure relates to methods, systems, apparatuses, and devices for facilitating conversational interaction with users to help the users.

BACKGROUND OF THE INVENTION

The United States EB-1A Green Card, also known as the "Einstein visa," is a highly sought-after immigration pathway for individuals with extraordinary ability in their field. The Next League Program is a holistic approach to obtaining the EB1A Green Card, accentuating personal growth and development, self-discovery, and unlocking the actual extraordinary ability of an individual.

The EB-1A Green Card is given to individuals with exceptional abilities who want to live and work in the United States. This visa category is reserved for those who have gained national or international recognition in their field, making it a desirable option for top talent worldwide. Obtaining an EB-1A Green Card can be life-changing. It allows individuals to pursue their careers and dreams in the United States without requiring employer sponsorship. It offers greater flexibility and stability than other visa categories, allowing beneficiaries to switch jobs, start businesses, and enjoy the benefits of permanent residency.

However, applying for an EB-1A Green Card can be complex and daunting. Applicants must provide significant evidence demonstrating their exceptional abilities and sustained national or international recognition. This requires a deep understanding of the criteria, strategies for presenting a compelling case, and the ability to showcase one's achievements effectively.

Given the high stakes and challenges involved, there is a clear need for comprehensive guidance and knowledge sharing to help individuals navigate the EB-1A Green Card process. Traditional immigration consulting services may not always provide the level of personalized attention and holistic support that applicants need to maximize their chances of success.

Therefore, there is a need for improved methods, systems, apparatuses, and devices for facilitating conversational interaction with users to help the users that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method for facilitating conversational interaction with users to help the users, in accordance with some embodiments. Accordingly, the method may include a step of transmitting, using a communication device, a conversational interaction interface for conversationally interacting with at least one user to at least one user device associated with the at least one user. Further, the method may include a step of receiving, using the communication device, at least one request of the at least one user through the conversational interaction interface from the at least one user device. Further, the method may include a step of identifying, using the processing device, at least one information based on the at least one request. Further, the method may include a step of generating, using the processing device, at least one input for at least one machine learning model based on the at least one request and the at least one information. Further, the at least one input may include the at least one request and the at least one information. Further, the method may include a step of processing, using the processing device, the at least one input using the at least one machine learning model. Further, the at least one machine learning model may be configured for generating at least one output based on the at least one input. Further, the method may include a step of generating, using the processing device, at least one response for the at least one request based on the processing of the at least one input. Further, the method may include a step of transmitting, using the communication device, the at least one response through the conversational interaction interface for conversationally interacting with the at least one user to the at least one user device. Further, the method may include a step of storing, using a storage device, the at least one machine learning model, the at least one request, and the at least one response.

Further disclosed herein is a system for facilitating conversational interaction with users to help the users, in accordance with some embodiments. Accordingly, the system may include a communication device, a processing device, and a storage device. Further, the communication device may be configured for transmitting a conversational interaction interface for conversationally interacting with at least one user to at least one user device associated with the at least one user. Further, the communication device may be configured for receiving at least one request of the at least one user through the conversational interaction interface from the at least one user device. Further, the communication device may be configured for transmitting the at least one response through the conversational interaction interface for conversationally interacting with the at least one user to the at least one user device. Further, the processing device may be communicatively coupled with the communication device. Further, the processing device may be configured for identifying at least one information based on the at least one request. Further, the processing device may be configured for generating at least one input for at least one machine learning model based on the at least one request and the at least one information. Further, the at least one input may include the at least one request and the at least one information. Further, the processing device may be configured for processing the at least one input using the at least one machine learning model. Further, the at least one machine learning model may be configured for generating at least one output based on the at least one input. Further, the processing device may be configured for generating the at least one response for the at least one request based on the processing of the at least one input. Further, the storage device may be communicatively coupled with the processing device. Further, the storage device may be configured for storing the at least one machine learning model, the at least one request, and the at least one response.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 4 is a flowchart of a method 400 for facilitating conversational interaction with users to help the users, in accordance with some embodiments.

FIG. 5 is a flowchart of a method 500 for facilitating conversational interaction with users to help the users, in accordance with some embodiments.

FIG. 6 is a flowchart of a method 600 for facilitating conversational interaction with users to help the users, in accordance with some embodiments.

FIG. 8 is a flowchart of a method 800 for facilitating conversational interaction with users to help the users, in accordance with some embodiments.

FIG. 11 is a graphical representation 1100 of human action dimensions identified by the common questions framework, in accordance with some embodiments.

FIG. 12 is a block diagram of an architecture 1200 of an application for facilitating conversational interaction with users to help the users, in accordance with some embodiments.

FIG. 14 illustrates a database structure 1400 for selecting unique identifications for facilitating conversational interaction with users to help the users, in accordance with some embodiments.

FIG. 18 is a flow diagram of a method 1800 associated with retrieval-augmented generation (RAG), in accordance with some embodiments.

FIG. 19 is a flow diagram of a method 1900 for adding next league program's data to a generative pretrained transformer (GPT), in accordance with some embodiments.

FIG. 21 is a block diagram of a real time retrieval augmented generation system 2100, in accordance with some embodiments.

DETAILED DESCRIPTION OF THE INVENTION

Figure 1:
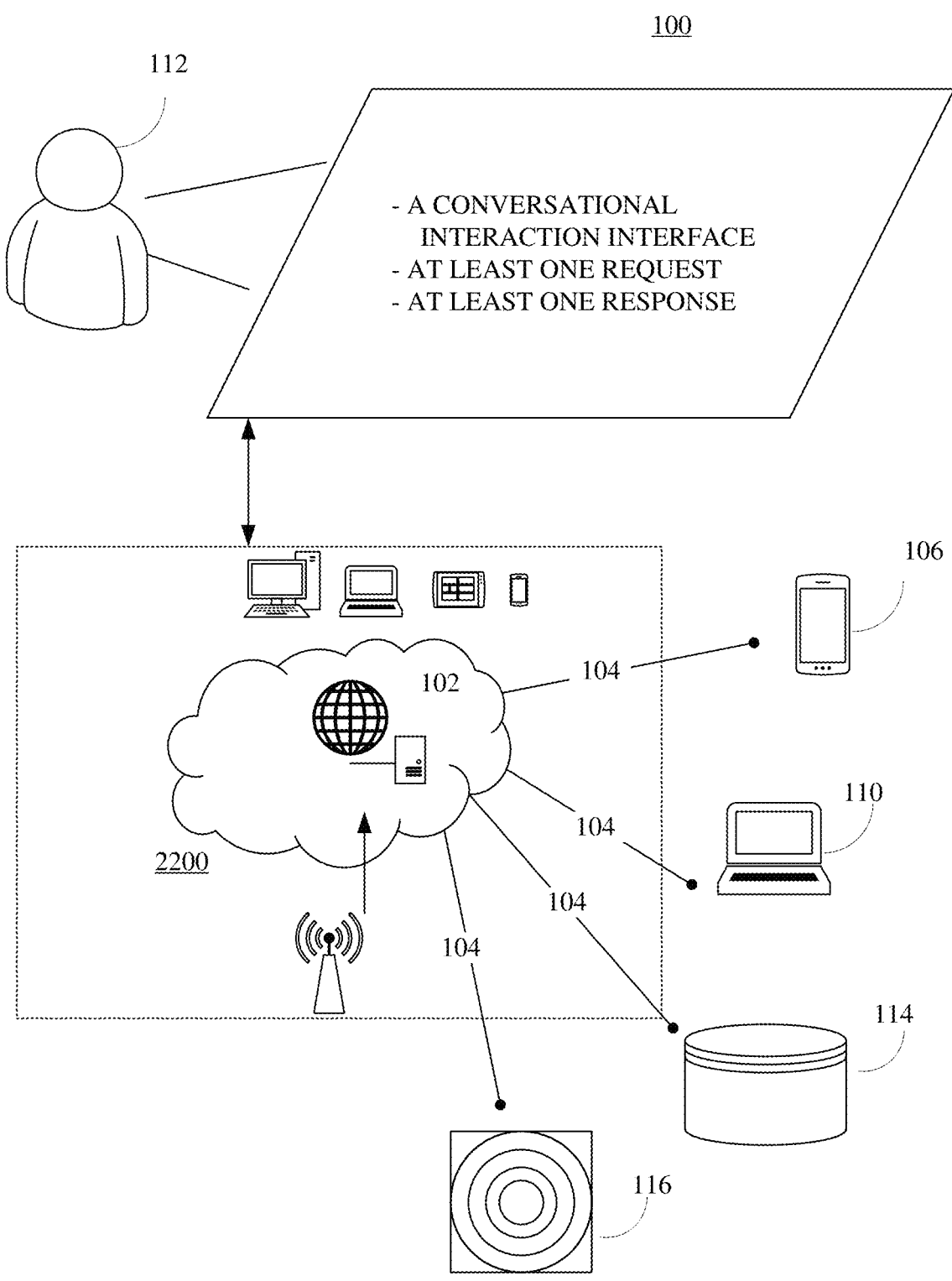
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating conversational interaction with users to help the users, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable data (e.g. username, password, passphrase, PIN, secret question, secret answer, etc.) and/or possession of a machine readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smart-card with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes an intelligent conversational system for personalized EB-1A guidance and self-discovery integration of design and large language models (LLMs).

Further, the present disclosure describes an EB1Xpert BOT. Further, the EB1Xpert BOT leverages AI technology and a vast knowledge base to offer tailored guidance, insights, and strategies and help individuals build more robust EB-1A cases. It can assist applicants in giving more details about what EB1A is, break all the myths of who can get one by providing accurate responses, and help identify their strengths, refine their brand, and present their achievements most compellingly.

The EB1A Xpert BOT utilizes the expertise modeling techniques including generating an expertise profile that characterizes an individual's expertise based on a learning state, progressive experience, and impact factor. The machine learning models are trained to provide values corresponding to these dimensions using individual information. Further, the EB1A Xpert BOT accurately assesses and model an individual's expertise for EB-1A evaluation.

Moreover, the EB1Xpert BOT goes beyond mere application assistance by promoting personal growth and self-discovery. It encourages individuals to unlock their full potential, not just for the sake of the visa application but for their overall professional and personal development. This holistic approach sets the BOT apart from traditional services, making it a game-changer in immigration and personal growth.

Further, the present disclosure describes the next league program. Further, the next league program innovates in immigration consulting and personal development. By combining the two disciplines, the program offers a unique approach to green card that goes beyond traditional application preparation. The program recognizes that an individual's extraordinary ability is not solely determined by their past achievements but by their potential for future success. Through a comprehensive curriculum that includes personal development workshops, mentorship, and tailored guidance, the Next League Program empowers applicants to unlock their full potential and present a compelling case for their eligibility under the EB-1A category.

Further, the EB1A Xpert stands out in the realm of immigration consulting by integrating AI with user centric approach in form of mobile app. Following is a table describing key differentiatior of EB1A Xpert from traditional system.

The following enhancements are the enhancement made for developing the EB1Xpert BOT:

1. Personalized Guidance:
   Tailor the app's content, prompts, and nudges based on the user's background, achievements, and areas requiring improvement related to EB1A criteria.
   Implement advanced user profiling and machine learning algorithms to deliver highly personalized recommendations and support.
2. Progress Tracking:
   Incorporate visual representations (e.g progress bars, checklists) to help users track their journey and feel a sense of accomplishment as they meet various EB1A criteria.
   Develop intuitive dashboard interfaces that provide users with a clear overview of their progress and next steps.
3. Social Proof:
   Highlight success stories and testimonials from individuals who have successfully met EB1A criteria to create a sense of confidence and motivation.
   Integrate social sharing features that allow users to connect with and learn from others in the EB1A community.

| No | Key differentiator features/ Value proposition | EB1A Xpert | Traditional Consultation |
|---|---|---|---|
| 1. | Personalization guidance and feedback | The BOT has large set of data which has deeper understanding of user's unique circumstances, leveraging large dataset using retrieval augmented generation to address all the queries. | The consultation on other hand may not address all the specific needs or questions with individual field due to constraint of human bandwidth and consultation's area of expertise may not always align with their users. |
| 2. | Scalability and continuous learning | Continuously improves through machine learning algorithms which learn from each interaction to enhance accuracy and effectiveness over time. | Traditional consolation on other hand depends on ongoing education and experience of the consultant, which may vary significantly between individuals and organization. |
| 3. | Comprehensive and up-to-date knowledge | Utilizes a comprehensive, constantly updated databases that includes the latest regulations and case studies. This ensures the guidance provided based on the most current information available. | While experienced consultants have a wealth of knowledge, they must actively seek out information on the latest legal changes, which can lead to go gaps or delays in delivering the most current advice. |
| 4. | Cost efficiency | Reduces costs associated with personal consultations. The automated nature of the BOT allows it to serve multiple users concurrently without additional costs. | Generally, involves higher costs due to the labor-intensive nature of the service, which includes one-on-one consultations, document reviews, and personalized response preparation. |
| 5. | Instant answers | Clarification of which accomplishment can be worked on for EB1A application. | Takes a lot of time and research on understanding unique expertise and need more than one consultation plus additional money which can be costly as well as time consuming. It will be never instant. |

4. Reminders and Notifications:

Implement timely reminders and push notifications to nudge users toward completing tasks or assessments related to EB1A criteria.

Utilize advanced scheduling algorithms and user preferences to deliver personalized and context-aware notifications.

5. Server-Side Caching Mechanism:

Develop a server-side caching mechanism to store and quickly retrieve responses to commonly asked questions.

Implement intelligent cache invalidation strategies to ensure the accuracy and relevance of cached responses.

6. Proactive Interaction with the User:

Enhance the chatbot's capabilities to initiate conversations proactively based on user behavior or predefined triggers.

Develop advanced analytics models to identify user patterns and deliver timely and relevant proactive support.

7. Offline Functionality:

Develop offline capabilities for the chatbot, allowing users to access frequently asked questions and receive answers without a network connection.

Implement secure data synchronization mechanisms to ensure seamless transitions between offline and online modes.

8. Enhanced Security:

Continuously update and strengthen the system's security measures, including advanced encryption techniques for data storage and transmission.

Implement support for secure authentication methods, such as Google or Apple login, to provide users with convenient and trusted access options.

9. Automatic Question and Answer Grouping:

Develop intelligent algorithms to automatically categorize questions and answers into relevant topics, such as the 10 EB1A categories and general inquiries.

Implement advanced natural language processing techniques to improve the accuracy and efficiency of the categorization process.

10. Real-Time RAG:

Develop capabilities to add real-time videos and documents to the vector database, enriching the chatbot's knowledge base.

Implement advanced model fine-tuning techniques, such as QLoRA, to continuously improve the chatbot's performance and adaptability.

Further, the present disclosure describes product discovery, user research and refining the requirements.

A market research is performed to understand if there is any other product featuring a similar application that is integrating the EB1A's comprehensive data, merging it in the form of the application, and responding through a mobile application by understanding the individual's unique needs. Focus groups are run and thinking sessions with prospect 100 EB1A applicants are designed. Result of the session was key differentiator of the application.

Further, the physics of the user is understood and a user interview with same group after working on the requirement and breaking down it in more granular level is conducted. The research involved two phases: one group discussion with 25 users on each session for 45 minutes, where the types of questions they are looking for when searching for information online concerning EB1A are asked. The second round of interviews was the design phase, where the design flow is tested and their reaction to the application's answers, interface, and efficiency are observed. The research aims to identify the key findings such as what are the most common questions users have, what situations are making them overwhelmed, timelines of the application process, cost of the application with and without lawyer fees, what they can do to enhance their profile and what are Dos and Don'ts. We understood their motivations, concerns, and expectations.

Further, the following is a table of user interview questions and summaries of answers:

| No. | Questions asked | Summary of answers | Usability result in % |
|---|---|---|---|
| 1. | How much do you know or are aware of EB1A green card process? | Most EB1A applicants are moderately knowledgeable about the EB1A application and petition process as it is crucial for their success. | 86% |
| 2. | What are the resources you are using to find information about the EB1A application? | Applicants frequently using official USCIS guidelines, immigration forums, legal blogs, and consulting with immigration attorneys. | 96% |
| 3. | How do current gather information regarding their visa process, and what sources do they trust the most? | The most trusted sources are usually government websites (like USCIS), followed by experienced immigration lawyers and reputable immigration consulting firms. | 94% |
| 4. | How much does it cost when you consult? How much it values and what is the cost? | The cost of consultation varies significantly, ranging from $150 to $500 per hour depending on the expertise and reputation of the consultant. Applicants find high value in consultations that offer clear, actionable advice tailored to their specific case. | 98% |
| 5. | What are the primary challenges faced when navigating the application process? | Common challenges include understanding complex legal requirements, gathering sufficient evidence to demonstrate extraordinary ability, and managing | 98% |

-continued

| No. | Questions asked | Summary of answers | Usability result in % |
|-----|----------------|-------------------|----------------------|
| | | the timing and documentation for the petition. | |
| 6. | What are the most common questions and concerns of EB1A applicants at different stages of their application process? | Early stage concerns often involve eligibility criteria and evidence collection, while later stages focus on case status, potential interview questions, and preparations for potential appeals. | 98% |
| 7. | How do EB1A applicants measure the credibility and reliability of immigration advice and guidance? | Credibility is often assessed based on the advisor's certifications, user reviews, track record of successful cases, and clear, consistent communication. | 96% |
| 8. | How important is personalized guidance to EB1A applicants, and what form should this personalization take? | Personalized guidance is critical due to the complex nature of EB1A petitions. This should include tailored advice on documentation, strategy for proving "extraordinary ability," and ongoing support throughout the application process. | 99% |
| 9. | How do you perceive the value of a mobile application in supporting their EB1A application process compared to traditional consulting services? | Mobile application is valued for its accessibility and convenience, providing quick answers and guidance on the go. However, it is often viewed as a complement to, rather than a replacement for, traditional consulting due to the complex legal nuances of EB1A applications. | 97% |
| 10. | What are the preferred methods of interaction (text, video, audio) with digital immigration tools among EB1A applicants? | Preferences vary; however, text is generally favored for quick queries, while video and audio are preferred for in-depth explanations and virtual consultations. | 98% |
| 11. | What additional support or resources do EB1A applicants feel they need most during their application process? | Applicants often seek more examples of successful cases, templates for documentation, and access to quick legal advice for unexpected questions or issues that arise during the application process. | 98% |

Further, in conclusion, the EB1A Xpert app has the potential to significantly empower applicants by providing trusted, personalized, and accessible immigration guidance. By addressing the identified challenges and leveraging the preferences for digital interaction, the app can enhance the EB1A application experience, providing a valuable tool that complements traditional consulting methods and supports applicants effectively through their journey with low cost and faster response by being available to the user on demand.

The user-centered design approach of the EB-1A guidance chatbot is deeply rooted in empathizing with users' needs, providing a nurturing and helpful experience for those navigating the complexities of the EB-1A process. The pivotal role of user research, especially during the design thinking and interview phase, was instrumental in honing the chatbot's functionality. These interviews, involving potential applicants and immigration experts, offered critical insights into user expectations and needs.

While working on the Information architecture, the design prototype, all the feedback, and needs were considered. After creating the wireframe and visual design usability, testing is conducted. During the design phase, observing potential users interact with the chatbot prototype was invaluable. It allowed for gauging the intuitiveness of the application flow and the relevance of the chatbot's responses. This iterative process of testing and gathering feedback was essential in refining both the functionality and the interface of the chatbot, ensuring it aligns with real user needs. The feedback obtained also facilitated the creation of a representative persona that embodies the typical user, which further guided the design decisions. This persona helped in developing a chatbot that not only meets but anticipates the needs of users throughout their EB-1A application process, ensuring the final product is both effective and empathetic.

Further, the EB1Xpert BOT leverages cutting-edge artificial intelligence and user experience design to deliver a comprehensive mobile e-learning platform. It simplifies access to EB1A green card information, making it available 24/7 at the user's fingertips. This integration enhances individual learning experiences by providing essential knowledge through an intuitive, always-available mobile interface.

The EB1A Xpert BOT represents a significant advancement in immigration consulting by leveraging AI to offer personalized, accessible, and cost-effective guidance. While traditional consulting services benefit from the human touch and professional expertise, the BOT's ability to scale, adapt, and update continuously provides a compelling alternative for those navigating the complex landscape of EB-1A applications.

Further, the design elements and user interface principals for an application associated with the EB1A Xpert BOT are as follows:

Typography: The application utilizes the Inter font family throughout its interfaces. Chosen for its excellent legibility and contemporary look, inter ensures that the text is readable across various devices and screen sizes. This choice is vital for keeping users engaged and making navigation through the app straightforward.

Iconography: All icons in the application are carefully crafted to maintain consistent proportions and line weights, enhancing the aesthetic appeal, and ensuring immediate recognition across the app. This consistency fosters a cohesive visual experience, contributing to a seamless and intuitive user interaction.

Layout: The application's layout is inspired by the golden ratio, a principle celebrated for its visually pleasing aesthetics. This ratio influences the spatial arrangement of interactive elements and text, creating a balanced and engaging interface. The thoughtful placement of components according to the golden ratio significantly improves the app's usability, facilitating easier user interaction and efficient information retrieval.

Accessibility: We ensured that designs are following the accessibility guidelines. A high contrast mode is available for users with low vision, enhancing the visibility of text and interactive elements. The app consists of default mode of apple's text-to-speech technology, allowing content to be read aloud, which benefits users with reading difficulties, visual impairments, or those who prefer auditory learning.

Further, the design elements implementation for the application associated with the EB1A Xpert BOT are as follows:

The user interface leverages the golden ratio in positioning and spacing elements to create an intuitive, visually appealing experience. For example, strategically placed registration/sign-in buttons on the welcome screen.

An aesthetically consistent iconography set is used, with each icon designed using harmonious proportions and line weights. The color scheme of deep blue (#15386C) was chosen based on color psychology principles to enhance engagement and influence behavior.

The blue represents trust and calmness while the red symbolizes energy and motivation. The clean and modern Inter font family was selected for its high legibility across screen sizes to ensure content is easily readable.

Friendly, relatable illustrations, especially on splash screens, depict scenarios users can identify with to create an approachable, human experience.

So, in summary, the user-centered, research-informed design incorporates behavioral economics principles and strategic visual elements to create an engaging, supportive user experience that encourages individuals to pursue the EB-1A path while facilitating personal growth and development. The design decisions aim to simplify the complex application process with an intuitive, accessible interface. Another thing we used was the Human action dimension framework to identify the problem statement. This framework helped us understand who we are building this application for, why we are doing it, and what needs to be done. It also helped us create the Information architecture.

Further, the application associated with the EB1A Xpert BOT is installed on the user's iOS device. The user opens the application, and like other BOT, they will send a query to EB1AXpert. This query will then be sent to the backend server for processing. Upon receiving the request, the backend server passes this request to the LLM component to process the requested query. The LLM component is trained by retrieval-augmented Generation (RAG) and shares appropriate answers based on the question. The LLM component receives the request from the backend server, processes it using the trained language model, and generates an appropriate response based on the request. Further, the response is then sent back to the backend server. The Prompt Layer is an intermediary between the LLM component and the backend server. It receives the response generated by the LLM component. The Prompt Layer can alter or modify the response, if necessary, based on predefined rules or templates. The modified response is then sent back to the backend server. The backend server interacts with the database to store and retrieve data. The database stores relevant information required for the application to function. The backend server receives the final response from the Prompt Layer. It sends the response back to the mobile application, which presents it to the user through the user interface.

Following is the step-by-step explanation associated with the EB1A Xpert BOT:

1. The user adds a query/question regarding EB1A by interacting with the mobile device and sending the request.
2. This request is forwarded to the backend server.
3. The backend server passes this request on to LLM for processing.
4. The LLM component generates a response based on the trained language model.
5. The response is sent to the Prompt Layer; here, we are altering the question by adding some instructions for the LLM.
6. The modified response is returned to the backend server.
7. The backend server retrieves or stores relevant data in the database if required.
8. The final response is sent back to the user. The Prompt Layer provides additional control and customization over the generated reactions before they are returned to the user.

This architecture allows for integrating a language model into the application, enabling natural language processing and the generation of responses based on user requests. The Prompt Layer provides additional control and customization over the generated reactions before they are returned to the user.

The user flow begins when a user opens the mobile application and makes a request. The application first determines whether the request can be handled locally or if it requires interaction with the backend server. If server interaction is unnecessary, the application processes the request internally and generates a response to display to the user, ending the flow. However, if the request does require server interaction, the application sends the request to the backend server. The server receives the request, processes it, and responds appropriately to the mobile application. Finally, the application gets the server's response and displays the generated response to the user on their mobile device, completing the user flow.

The user opens the mobile application.
1. The user requests within the application.
2. The application checks if the request requires interaction with the backend server.
   a. If no server interaction is needed, the application processes the request and generates a response to display to the user. The flow ends here.
   b. The application requests the backend server if server interaction is required.
3. The backend server receives the request from the application.
4. The server processes the request.

5. The server sends the appropriate response back to the mobile application.

6. The mobile application receives the response from the server.

7. The application displays the generated response to the user on their mobile device.

Further, the present disclosure describes A/B testing process for the EB1A Xpert BOT. The A/B testing process for the EB1A Xpert BOT followed a systematic approach:

1. Hypothesis Formulation: The specific areas of the chatbot that could potentially be improved are identified, such as response accuracy, user engagement, or conversational flow. Further, hypotheses are formulated about how different variations of the chatbot's features or algorithms might impact these metrics.

2. Variant Creation: Two versions of the chatbot (Variant A and Variant B) were created, each incorporating different modifications or improvements based on the hypotheses. These variations included changes to the prompt engineering techniques, natural language processing algorithms, or user interface elements which can be further read in Table 3.

3. User Segmentation: The user base was randomly divided into two groups, with each group assigned to interact with either Variant A or Variant B of the chatbot. This random assignment ensured that any differences in user behavior or preferences were evenly distributed across the two groups.

4. Metrics Tracking: Key performance indicators (KPIs) were defined to measure the success of each chatbot variant. These metrics could include user satisfaction ratings, engagement levels (e.g. number of interactions, time spent), response accuracy, or task completion rates. The tracking mechanisms are implemented to collect data on these metrics throughout the testing period.

5. Data Analysis: After a predetermined testing period, the collected data from both variants was analyzed to determine which version performed better against the defined KPIs. Statistical significance tests were conducted to ensure that the observed differences were not due to random chance.

6. Iteration and Optimization: Based on the insights gained from the A/B test results, informed decisions about which changes to implement permanently in the chatbot are made. The successful variations were incorporated into the main version of the EB1A Xpert BOT, while the underperforming variations were discarded or further refined.

Some specific examples of A/B tests conducted for the EB1A Xpert BOT could include:

Testing different prompt templates to determine which one elicits more relevant and accurate responses from the language model.

Comparing the effectiveness of different question-answering algorithms in providing satisfactory answers to user queries.

Evaluating the impact of personalized greetings or contextual suggestions on user engagement and satisfaction.

Assessing the usefulness of different types of visual aids or multimedia elements in enhancing the user experience.

Further, a table describing variant creation of the prototype to understand which designs and experiences were better are as follows:

| No | Design A vs. Design B | User Feedback | Implementation done based on feedback |
|---|---|---|---|
| 1. | Option A - Splash Screens Option B - No Splash Screen Design thinking behind it - Splash screens can serve as a valuable branding tool, providing users with a consistent reminder of the brand's identity which can strengthen loyalty and familiarity. However, they might lead to user impatience, especially if perceived as unnecessarily prolonging the app's startup time. Opting for no splash screen allows users immediate access to the app's features, enhancing efficiency and streamlining the user experience. This approach is favored in utility apps where speed and direct functionality are prioritized, though it may sacrifice opportunities for emotional brand engagement. | Most of the user said showing importance of brand presence, user expectations, and the technical requirements of the app (e.g. initial loading times). Utility apps might benefit from skipping splash screens to offer immediate functionality, whereas experience-driven apps, where mood and branding are important, might justify their use. Ultimately, balancing user feedback with the goals of the app will guide the best approach to splash screens. | Hence based on the user feedback and majority of the user loved option one with splash screens, we added them to the final design's deliverables. |
| 2. | Option A - Not adding Persona to the Bot Option B - Adding persona to the Bot. Design thinking behind it - Choosing not to add a persona to the bot can be beneficial for applications where the focus is strictly on utility and efficiency. This approach can lead to a perception of the bot as a neutral tool, particularly suitable for environments that require | Most of the user resonated themselves with persona which was giving them more humanized experience inside the BOT. Adding a face of human was impactful design decision according to them. | We incorporated those feedback into final design deliverables and changes were made to the Option A and added the persona name Tina. |

-continued

| No | Design A vs. Design B | User Feedback | Implementation done based on feedback |
|----|----------------------|---------------|---------------------------------------|
| | straightforward, unbiased information delivery, such as in technical or data-driven fields. Users might appreciate the directness and simplicity, as it avoids the complexities that personalities might introduce, making interactions quick and to the point. Incorporating a persona into a bot can significantly enhance user engagement by giving the bot a relatable and memorable character. This can be particularly effective in consumer-facing applications where user experience benefits from a more personalized and human-like interaction. A persona can help in building a stronger emotional connection with users, which can be crucial for applications in customer service, education, or health where trust and comfort are important. However, it requires careful design to ensure the persona aligns with the brand's image and appeals to the target audience. | | |

Further, the following are design decisions:

1. Splash screens: Incorporated educational splash screen with the banner of the next league program, an academic institute with a small tracker and arrow button to move backward and forward to encourage users to know more about the application and what they can know about EB1A criteria.

2. Gradual disclosure: The bot will share the response to the question step-by-step without overwhelming the user.

3. Positive reinforcement: Provide encouraging feedback and affirmations in all the responses. It does not use any negative connotations such as not possible or never, or not.

4. Privacy and Data Security: Collecting and analyzing user data (with appropriate consent and privacy measures) to continuously improve the app's nudging strategies and their effectiveness in guiding users toward meeting EB1A criteria.

5. Accessible design: Ensure the app is designed with accessibility in mind, incorporating features such as text-to-speech, speech-to-text, and support for assistive technologies.

Further, the following are additional design and strategy decisions: There were a couple of findings that were obtained while interviewing users which helped in adding more details to the application such as:

1. Adding the disclaimer that says—I am AI Bot, and I may display inaccurate info, including about people so please double check my response.

2. We added Terms of Use and Privacy Policy of the application which was important for users to know what data protection are and giving them accurate information about Next League program too.

3. Added delete account feature if user wants to remove themselves from the application.

4. Added contact information about Next League Program if any users wanted to join the program.

Further, the following is a table describing quality assurance testing to ensure the quality of the response by the EB1A Xpert BOT:

| No. | Questions asked to BOT to check the accuracy of the answers and ensuring no hallucination by EB1A Xpert BOT to update prompt engineering | Responses by EB1A Xpert BOT |
|-----|------------------------------------------------------------------------------------------------------------------------------------------|------------------------------|
| 1. | Is a PhD or national award required for EB1A? | A Ph. D. or national award is not required for an EB1A Green Card application. The focus is on demonstrating extraordinary ability in your field, sustained acclaim, and impactful contributions rather than specific academic credentials or awards. Many professionals have successfully obtained their EB1A Green Card without holding a Ph. D. or receiving national awards, emphasizing the importance of sustained acclaim and totality in the application |

-continued

| No. | Questions asked to BOT to check the accuracy of the answers and ensuring no hallucination by EB1A Xpert BOT to update prompt engineering | Responses by EB1A Xpert BOT |
|---|---|---|
| | | process. Hence to summarize: A Ph. D. or national award is not a strict requirement for the EB1A Green Card. Focus on demonstrating sustained acclaim, extraordinary ability, and impactful contributions in your field. Success in the EB1A application is achievable through sustained expertise and impactful achievements, regardless of specific academic credentials or awards. |
| 2. | Do I qualify for EB1A? | Based on the information provided, you may qualify for the EB1A Green Card based on your sustained acclaim, extraordinary ability, and impactful contributions in the field of iOS development. USCIS does not prioritize candidates with a Ph. D. over those without one; the focus is on meeting the criteria for original contributions and demonstrating outstanding abilities in your field. Hence to summarize: USCIS does not prioritize candidates with a Ph. D. for the EB1A category. Focus on demonstrating sustained acclaim and extraordinary ability in iOS development. Emphasize your original contributions and outstanding abilities in your field to strengthen your EB1A application. |
| 3. | Do I need more than 100 citations to qualify for the scholarly article criterion? | Submitting a research paper as evidence for both original contribution and scholarly articles criteria may not be appropriate. USCIS officers consider the impact of scholarly articles through citations, but there is no specific number of citations deemed sufficient. It's crucial to demonstrate the influence and significance of your scholarly work through the quality and impact of the citations received. Therefore, while exceeding 100 citations can be beneficial, the focus should be on the quality and impact of the citations rather than a specific quantity. Hence to summarize: Submitting the same research paper for both criteria may not be suitable The impact of scholarly articles is assessed through citations quality and impact Focus on demonstrating the influence and significance of your scholarly work rather than a specific number of citations. |
| 4. | How much time would it take to build my profile? | Building your profile for an EB1A application typically requires about a year and a half to develop and strengthen your achievements, aligning them with the EB1A criteria. This timeframe allows for refining your profile, gathering necessary documentation, and working towards fulfilling the EB1A requirements effectively. The process involves enhancing professional milestones, cultivating a profile that meets EB1A standards, and engaging in activities to demonstrate extraordinary ability in your field. Hence to summarize: Building your EB1A profile may take around a year and a half Focus on enhancing achievements, aligning with EB1A criteria, and engaging in relevant activities The process involves refining your profile, gathering documentation, and demonstrating extraordinary ability. |

-continued

| No. | Questions asked to BOT to check the accuracy of the answers and ensuring no hallucination by EB1A Xpert BOT to update prompt engineering | Responses by EB1A Xpert BOT |
|---|---|---|
| 5. | Do you like get out movie? | I apologize, but this question is outside of my expertise as an executive coach. I am only able to answer questions related to EB1A. |

Further, queries on the app are performed more than 2000 times in a period of six months from beta testing to final production and the prompts were refined based the answers.

Further, Final Prompt used for the application: "Whenever the conversation asks about NLP it by default means 'Next League Program' unless the user talks about Natural Language Processing as a field of their expertise. Please don't use no, not, never, don't, or any other negative connotations in any answer. Please use Ranjeet Mudholkar's persona in your response. Please concise your response within 100 words, and at the end, say Hence to summarize; and give 3-5 bullet points summarizing the same. If you don't know the answer, please reply 'I apologize, but this question is outside of my expertise as an executive coach. I am only able to answer questions related to EB1A'. Never mention that you are referring documents. Never mention any EB1A achievers' names or addresses; refer to them by their expertise to ensure their names are not revealed."

Currently, the app has three major components: a frontend in Swift, a Backend in Node.js, and an OpenAI API to get answers for the chatbot.

Further, the major components of the application include client, server, and OpenAI's Assistants API.

Primary Features of the client iOS Mobile application: Currently, there is only iOS application for the chatbot. The system architecture leverages Swift, SwiftUI, and The Composable Architecture for client-side operations. Swift is a powerful and intuitive programming language for all Apple platforms. Swift code is safe by design and produces software that runs lightning fast. [3] SwiftUI is a modern way to declare user interfaces for any Apple platform. Create beautiful, dynamic apps faster than ever before [4]. The Composable Architecture (TCA, for short) is a library for building applications in a consistent and understandable way, with composition, testing, and ergonomics in mind. [5] The client's responsibilities are to sign in to the user and then take prompt input. The client also monitors how many requests the client has made and responds to the user.

Further, the following are the key features of the client:

Login/Register Flow: The app allows users to sign in and register.

Data Encryption: User login credentials are encrypted and stored in Keychain Services API to ensure data integrity and security. Once the user logs out, we also delete the credentials from the Keychain. The keychain services API helps you solve this problem by giving your app a mechanism to store small bits of user data in an encrypted database called a keychain. [6]

Auto-Login: To ensure that the user has a seamless experience with the chatbot, we have added functionality to auto-login the user if we have credentials stored in the Keychain.

Logout feature: On user logout, the client deletes the credentials that were saved for auto login.

Chatbot View: After logging in the user sees the chatbot screen. If there are no persisting messages, the user sees the prompt suggestion screen where the user can start the initial conversation. In case the device has some persisted messages for the user, then the user will see the previous messages on the chatbot. Any submitted messages are sent to the server. Moreover, after the user presses the send message, we check if the user hasn't exceeded the rate limit of 1000 queries set per month, this is to ensure that unlimited requests made by the user doesn't overload the server. Another feature that the chatbot view has is to scroll to the bottom for the user to bring attention to the latest message received by the server.

Subscription and Rate Limit Checks: Initially, the client verifies whether the user has exceeded the free tier limit or requires a subscription, if yes then we show a paywall to the user to pay. Post paying for the subscription, the client automatically sends the last typed message to the server to get back the message. Additionally, the system checks if the user has made over 1,000 monthly calls to prevent server overload. Exceeding this limit prompts a message about the rate limitation, advising users to return the following month.

The client also provides users to delete the account but provides a simple button in the user setting screen.

Further, the primary features of the server: Node.js is used for server-side operations, enabling seamless interfacing with server backends and databases. Node.js is an open-source, cross-platform JavaScript runtime environment and library for running web applications outside the client's browser. The Server is responsible for authenticating the user, processing requests, interacting with the database, and communicating with the ChatGPT Assistant API.

Prompt Input and Processing: The server receives the prompt from the client, evaluates it for compliance and content, and uses prompt engineering before sending it to Open AI.

Data Encryption: Sensitive user data, such as passwords, is encrypted to protect privacy and enhance security before being stored in the database.

Prompt Response Management: On the response initiated by the client, the server checks if there is already a thread present for the user or if it initiates a new thread. Once the thread is This thread is managed until completion.

Error Handling.

Robust Exception Management: Both client and server sides can handle errors gracefully. Operational failures trigger comprehensive error messages about the user, maintaining transparency and trust.

User Authorization: To authorize the user request, the user ID is ensured to be present in the database with each call. User IDs are sent to the server with every client request. Since the server creates user IDs, checking for them for authorization is appropriate in this case.

API key Verification and Authorization: An application programming interface (API) key is a code to identify and authenticate an application or user. API keys are available through platforms, such as a white-labeled internal marketplace. They also act as a unique identifier and provide a secret token for authentication. [16]. The client stores send the private API key for client authorization. This ensures that the server only handles requests from the clients.

MySQL Database: The server uses the MySQL database to store our data. MySQL is a widely used relational database management system (RDBMS). [8] Further, three primary tables are used such as users, prompt Count, and thread. User tables store the encrypted credentials of our users. Prompt Count stores information related to how many prompt requests our users made. The thread table stores OpenAI's Assistant tool thread ID for each user.

Queue and Worker System: To handle the high volume of requests and ensure efficient processing, a queue and worker system on the server are implemented. This system helps manage the workload and prevents server overload.

Queue System: A queue is integrated to specifically to handle incoming requests prompt requests from clients. When a request is received, it is added to the queue instead of being processed immediately. This allows the server to handle a large number of concurrent requests without overwhelming the system.

Worker System: The worker system consists of multiple worker processes that continuously monitor the queue for pending requests. When a request is available in the queue, a worker picks it up and processes it. The worker is responsible for the following tasks:

1. Prompt Engineering: The worker applies prompt engineering techniques to the user's input, ensuring that the prompt is optimized for the OpenAI API.

2. Thread Management: If a new thread needs to be created for the user, the worker initiates the thread creation process with the OpenAI Assistants API. If the user has an existing thread, the worker retrieves the thread ID from the database.

3. Add Message to Thread: The worker adds the prompt-engineered message to the user's thread using the OpenAI Assistants API.

4. Run Thread: Once the message is added, the worker triggers the OpenAI API to run the thread and generate a response.

5. Fetch and Send Response: After the thread has been processed, the worker fetches the latest message from the OpenAI API and sends the response back to the client.

This queue and worker system, powered by Redis, ensures that requests are processed efficiently, even during periods of high traffic. It also helps distribute the workload across multiple workers, preventing any single process from becoming overwhelmed.

Exponential Backoff for Rate Limiting: To handle rate limiting from the OpenAI Assistants API and prevent server overload, an exponential backoff mechanism is implemented. This mechanism helps the server gracefully handle situations where the API returns a "429"

status code, indicating that the rate limit has been exceeded. When a rate limit error occurs, the server waits for an exponentially increasing delay before retrying the request. The delay starts at 1 second and doubles for each subsequent retry, up to a maximum of 2 retries. If the maximum number of retries is reached, an error is thrown, and the request is considered failed. This exponential backoff mechanism helps reduce the load on the OpenAI API and prevents the server from being overwhelmed by rate limit errors, while still allowing retries in case of temporary rate limiting issues.

To host the server, Hostinger is used which is a globally recognized web hosting company. They provide premium-level server performance and localized support. The current server configuration is as follows:

Operating System: Ubuntu 23.04

CPU cores: 4

Memory 16 GB

Bandwidth: 16 TB

Disk Space: 200 GB

Currently, only HTTPS requests are supported with the server for which the HTTP requests are disabled on server's port 8080 and only HTTPS requests are listened on server's port 443. HTTPS requests are very secure over HTTP requests. The S in HTTPS stands for "secure." HTTPS uses TLS (or SSL) to encrypt HTTP requests and responses [12].

To disable HTTP and ensure that all traffic uses HTTPS, the Nginx configuration is modified by redirecting all HTTP traffic to HTTPS. This is a common practice to enhance security by ensuring that all communications between users and servers are encrypted.

Further, a RESTful API is implemented due to its simplicity, scalability, and flexibility. RESTful APIs follow standard conventions using HTTP methods (GET, POST, PUT, DELETE) to perform Create, Read, Update and Delete (CRUD) operations, making them easy to understand and integrate. The stateless nature of REST enhances scalability, allowing for horizontal scaling without session state management. Additionally, RESTful APIs can handle various data formats, and we use JSON (JavaScript Object Notation) for its lightweight and widely supported structure. Error handling is managed through standardized HTTP status codes and detailed error messages within the JSON responses, ensuring clear communication of issues to API consumers.

Further, the backend database schema of the application is quite simple, designed to cater to the core requirements of the application.

Further, the following are key tables and fields:

Current

Users.

This table stores user information such as user ID, name, email, encrypted password.

It follows 3NF as all non-key attributes (name, email, encrypted password, user preferences) are dependent only on the primary key (user ID).

Conversations/Threads:

Stores conversation history, including user ID, thread ID, messages.

It follows 3NF as all non-key attributes (thread ID, messages) are dependent only on the combination of primary keys (user ID, thread ID).

Prompts Count Per User:

Store number of prompts requested by the user, Including userID as the primary key.

It follows 3NF as there is only one non-key attribute (number of prompts), which is fully dependent on the primary key (user ID).

Further, the following is the database schema and functionality:

The database schema is designed to support the core functionality of the application, including user authentication, conversation management, knowledge base integration, subscription management, and analytics tracking.

The schema facilitates efficient data retrieval and storage while maintaining data integrity and consistency.

Indexing strategies are employed to optimize query performance for frequently accessed data.

Further, the following are interaction with different components of the system:

Client-Server Interaction: The client communicates with the server for many requests such as login, registering user, prompt query response, updating password, and helping with when to show a paywall to the user.

One of the app's prime features is to serve our users with EB1A and Next League Program-specific information. As shown in the app designs, users are provided with an input box to write their queries. The above flowchart explains how the current prompt request flow works. After the clients press the send button, whether the user has made 1000 requests in a month is checked on the client side. This is to make sure that the rate limiting on the client is enforced so that the user can overload the server with frequent requests. Client- and server-side rate limits help limit a device's overall network usage and bandwidth consumption by not sending data in the first place. [14]

If the client-side rate limit check passes, the request is sent to the server. The server is responsible for checking whether the requests are from a legitimate source. For that, the server verifies that the API key sent in the request header matches the stored key on the server. The requesting user credentials are verified to be in the database to ensure the server doesn't handle unauthorized requests.

After this check, the server adds the prompt request to a queue. A worker system continuously monitors the queue and picks up requests one by one for processing. Post authentication and authorization, the worker checks if the user already has an OpenAI thread reference in our database to request the prompt. If the user does not have a thread, the worker requests OpenAI to create one. Once the worker retrieves the thread, it adds it to our database.

The worker then checks if the user has made more than seven prompt requests before and if the user currently has a subscription purchased via the client. If not, the server sends a response to show the paywall to the user on the client.

If the user has an active subscription and has not exceeded the prompt request limit, the worker is responsible for prompt engineering, managing the OpenAI thread for the user (creating a new thread or retrieving an existing one), adding the prompt-engineered message to the thread, and running the thread using OpenAI.

If the thread run encounters rate limiting from the OpenAI API, the server implements an exponential backoff mechanism to retry the request with increasing delays up to a maximum of 2 of retries.

After successfully running the thread, the server requests the latest message from the thread. The fetched message is then sent back to our client, which displays the response to the user.

Server—OpenAI interaction: The Assistants API is used to handle our clients' requests. This API helps with multiple types of requests. This includes creating threads for users, running the thread, and fetching messages from the thread. Creating a thread with the OpenAI API is like creating separate conversations on ChatGPT. Each thread represents a conversation.

The worker system on the server handles the interaction with the OpenAI Assistants API. When a worker picks up a request from the queue, it first checks if the user already has an OpenAI thread reference in our database. If the user does not have a thread, the worker calls the Assistants API to create a new thread. After fetching the thread, the worker stores the thread ID in our MySQL database for the user.

On subsequent requests from the same user, the worker fetches the thread ID from the database and uses it to add the prompt-engineered message to the thread. The worker then runs the thread using the OpenAI API and fetches the latest messages generated by the API.

In some cases, the OpenAI API may fail to complete the run or return an incomplete status. In such situations, the worker system catches the error and attempts to create a new thread for the user. The worker then repeats the process of adding the prompt-engineered message to the new thread and running it using the OpenAI API.

Performance Optimization Techniques: Caching: To ensure a smooth and responsive user experience, caching of user chats directly on the user's devices is implemented. This approach prevents redundant calls to the servers, which would otherwise need to query OpenAI to fetch thread data on every app launch. By caching locally, the number of server requests is significantly reduced, enhancing performance and reducing latency. Additionally, this method aligns with our current design where our server does not store chat history, thereby maintaining user privacy and optimizing resource usage.

Deployment and Distribution Strategy: The current deployment and distribution strategy focuses on the iOS native app. The app is distributed on a weekly basis through the Apple App Store to ensure users have access to the latest features and improvements regularly. To streamline the submission process, the app adheres to Apple's guidelines and best practices, ensuring that the app meets all necessary requirements for approval.

For versioning, semantic versioning principles are followed, allowing to clearly communicate updates and changes to users. Each release is carefully tested to maintain quality and stability, with minor updates addressing bug fixes and performance improvements, and major updates introducing new features. By maintaining a robust deployment and distribution strategy, a reliable and consistently improving app experience is delivered to the users.

Further, the followings are challenges faced and potential mitigation strategies:

User Experience and Design Challenges: While designing a user-friendly chatbot interface for the complex EB-1A application process presents several challenges.

Ensuring accessibility and inclusivity for users with diverse abilities is crucial, requiring the incorporation of features like text-to-speech, speech-to-text, and compatibility with assistive technologies. Creating the visually appealing mobile application which also allows user with other disability and can be accessed with the Tablet or in web was not part of scope/Creating an intuitive and visually appealing chatbot interface involves organizing vast amounts of information into a logical structure, balancing simplicity, and comprehensiveness, and maintaining a consistent visual language. Implementing the error for certain unknows was something I didn't think of. It was identified during the usability testing and few users reported the issues in lower version of the iOS. Which helped us create the new elements and work on the edge cases for it.

Difficulties in Fine-Tuning the Language Model:

1. Domain-Specific Data Scarcity: One of the primary challenges in fine-tuning the language model for the EB-1A chatbot is the scarcity of domain-specific data. The EB-1A process is a niche area, and finding enough high-quality, relevant data to fine-tune the model can be difficult. The limited availability of data can hinder the model's ability to learn the nuances and intricacies of the EB-1A domain. To address the data scarcity issue, the present invention employs data augmentation techniques. This involves leveraging existing EB-1A resources, such as policy documents, legal cases, and success stories, and applying techniques like text generation, paraphrasing, and data synthesis to generate additional training samples. By augmenting the dataset, the model can be exposed to a wider range of examples and learn from a more diverse set of inputs.

2. Handling Complex and Ambiguous Queries: The EB-1A process involves complex legal requirements, eligibility criteria, and case-specific nuances. User queries related to EB-1A can be highly complex, ambiguous, and context-dependent. Fine-tuning the language model to accurately interpret and respond to such queries poses a significant challenge. To handle complex and ambiguous queries, the present invention incorporates advanced natural language understanding techniques, such as named entity recognition, semantic parsing, and intent classification. These techniques enable the model to better understand the user's intent, identify key entities and concepts within the query, and disambiguate the context. Additionally, the model is trained on a diverse set of annotated examples that cover various types of queries and their corresponding responses, helping it learn to handle complexity and ambiguity.

3. Ensuring Consistency and Coherence in Responses: Maintaining consistency and coherence in the chatbot's responses across different user interactions is crucial for providing a reliable and trustworthy user experience. However, achieving this level of consistency can be challenging, especially when dealing with a large knowledge base and diverse user queries. To ensure consistency and coherence in responses, the present invention employs several techniques. Firstly, the knowledge base is carefully curated and structured to maintain a consistent representation of information. The ontology and taxonomy used to organize the knowledge base help in maintaining logical relationships and avoiding contradictions. Secondly, the model is trained using techniques like response generation regularization and coherence modeling, which encourage the generation of consistent and coherent responses. Additionally, the model's outputs are monitored and evaluated for consistency, and any discrepancies are addressed through further fine-tuning and model adjustments.

Difficulties in Achieving Desired Levels of Accuracy and Relevance:

1. Handling Rare and Edge Cases: The EB-1A process encompasses a wide range of scenarios, including rare and edge cases that may not be well-represented in the training data. Ensuring that the model can accurately handle these less common cases is a significant challenge. To address rare and edge cases, the present invention employs few-shot learning techniques. Few-shot learning allows the model to learn from a small number of examples and generalize to new, unseen cases. By providing the model with carefully selected examples of rare and edge cases during fine-tuning, it can adapt and improve its performance on these scenarios. Additionally, the model's performance on rare and edge cases is continuously monitored, and targeted fine-tuning is performed to enhance its accuracy in handling these cases.

2. Dealing with Evolving EB-1A Policies and Requirements: The EB-1A landscape is subject to changes in policies, regulations, and interpretations over time. Keeping the chatbot's knowledge base and responses up to date with the latest developments is a challenging task. To deal with evolving EB-1A policies and requirements, the present invention implements a continuous learning and updating mechanism. The knowledge base is regularly reviewed and updated with the latest information from authoritative sources. The language model is periodically fine-tuned on the updated knowledge base to incorporate the latest changes. Additionally, a feedback loop is established, where user feedback and domain expert input are used to identify and address any outdated or inaccurate information in the chatbot's responses.

3. Balancing Specificity and Generalization: Achieving the right balance between providing specific, detailed guidance and offering general, broadly applicable advice is a delicate task. Overly specific responses may not be applicable to a wide range of users, while overly general responses may lack the depth and relevance required for effective guidance. To balance specificity and generalization, the present invention employs a hierarchical response generation approach. The model is trained to provide responses at different levels of granularity, ranging from high-level overviews to detailed, step-by-step instructions. The model dynamically selects the appropriate level of specificity based on the user's query and context. This allows the chatbot to provide tailored guidance that is specific enough to be actionable while still maintaining broad applicability.

In addition to these strategies, the present disclosure describes incorporating continuous monitoring, evaluation, and iterative refinement processes. The model's performance is regularly assessed using both automated metrics and human evaluation. User feedback, domain expert input, and error analysis are used to identify areas for improvement. The model undergoes periodic fine-tuning and updates based on these insights, ensuring that it remains accurate, relevant, and up to date. By employing these strategies and continuously refining the language model, the present invention aims to overcome the difficulties in fine-tuning and achieving desired levels of accuracy and relevance in the chatbot's responses. The goal is to provide users with reliable, comprehensive, and personalized guidance throughout the EB-1A process, enabling them to make informed decisions and increasing their chances of success.

Further, dependence on external data sources and APIs could impact system reliability as follows:

Inherent limitations and biases of machine learning models may affect expertise assessment accuracy.

Staying current with evolving EB-1A regulations and policies requires ongoing updates Further, the following are mitigation strategies:

Implement robust error handling and failover mechanisms for external dependencies Continuously monitor and retrain models with updated data to improve accuracy Dedicate resources to regulatory monitoring and promptly adapt the system to policy changes Further, the following are integration challenges:

Faced challenges in integrating the various components, such as the iOS app frontend, backend services, and knowledge base.

Addressed by establishing clear communication protocols, data formats, and API contracts.

Implemented comprehensive integration testing to catch issues early and ensure seamless communication.

Further, the following are the inferences in choosing the right language model (LLM) tool:

Faced a challenge in deciding between the CustomGPT API and the OpenAI Assistants API for the language model needs.

CustomGPT API provided highly accurate and impressive responses, but it was more expensive compared to the OpenAI Assistants API.

After careful evaluation, the OpenAI Assistants API was chosen as it offered a more cost-effective solution while still providing satisfactory performance.

Further, the OpenAI Assistants API Beta Phase:

The OpenAI Assistants API was in beta phase during the development process, which posed a challenge due to frequent updates and potential instability.

The API changes were closely monitored and the codebase was adapted accordingly to ensure compatibility and smooth integration.

Robust error handling and fallback mechanisms were implemented to gracefully handle any API related issues or downtime.

Further, the following are the comparisons between the OpenAI Assistants API and the CustomGPT API:

The OpenAI Assistants API and CustomGPT API are both language models designed for natural language processing tasks, but they differ in their underlying architecture and capabilities.

OpenAI Assistants API:

Developed by OpenAI, a leading artificial intelligence research company.

Based on the GPT (Generative Pre-trained Transformer) architecture, which is a powerful language model capable of generating human-like text.

Offers a more cost-effective solution compared to CustomGPT, making it suitable for budget-conscious projects.

Provides satisfactory performance for many natural language processing tasks, such as text generation, summarization, and question answering.

Still in the beta phase, which means frequent updates and potential instability.

CustomGPT API:

Developed by a third-party company specializing in language model development, which uses ChatGPT as their base model.

Known for providing highly accurate and impressive responses, often outperforming other language models.

More expensive compared to the OpenAI Assistants API, which may not be feasible for projects with limited budgets.

Likely to be more stable and mature compared to the OpenAI Assistants API, as it is not in the beta phase.

Currently, the app has three major components: a frontend in Swift, a Backend in Node.js, and an OpenAI API to get answers for the chatbot.

Further, the following are the major components of the application: There are three major components of the application, client, server, and OpenAI's Assistants API.

Further, the Artificial Intelligence Model corresponding to the LLM Model based backend: The application employs a state-of-the-art language model based on the Generative Pre-trained Transformer (GPT) architecture, specifically utilizing the OpenAI Assistants API. The GPT model is a deep neural network consisting of multiple transformer layers, each composed of self-attention mechanisms and feedforward neural networks. The self-attention mechanism allows the model to attend to different parts of the input sequence, capturing long-range dependencies and contextual information. The GPT model undergoes a two-stage training process. Firstly, it is pre-trained on a vast corpus of diverse text data using unsupervised learning techniques, such as masked language modeling and next sentence prediction. This pre-training stage enables the model to learn general language understanding and develop a rich set of linguistic features and patterns. The pre-training dataset encompasses a wide range of sources, including web pages, books, articles, and other textual data, ensuring a comprehensive language understanding. Secondly, the pre-trained GPT model is fine-tuned on domain-specific data relevant to the EB-1A guidance application. The fine-tuning dataset consists of carefully curated information related to EB-1A policies, requirements, success stories, and the Next League Program. By fine-tuning the model on this specialized dataset, it adapts to the specific domain and acquires the necessary knowledge to provide accurate and relevant guidance to users. The selection of the GPT-based OpenAI Assistants API is based on rigorous benchmarking and evaluation metrics. The model's performance is assessed using industry-standard metrics such as perplexity, which measures the model's ability to predict the next word in a sequence, and BLEU score, which evaluates the quality of generated text against human-written references. Additionally, human evaluation is conducted to assess the coherence, relevance, and usefulness of the model's responses in the context of EB-1A guidance.

Further, the application employs advanced prompt engineering techniques to optimize the interaction between the user and the language model. The prompts are meticulously crafted using a combination of few-shot learning, chain-of-thought prompting, and prompt tuning. Few-shot learning involves providing the model with a small number of exemplary question-answer pairs related to EB-1A guidance. These examples serve as a context for the model to understand the desired format and style of the responses. By conditioning the model on these examples, it can generate responses that align with the provided context. Chain-of-thought prompting is utilized to break down complex questions into a series of smaller, interconnected prompts. This technique enables the model to reason step-by-step, considering various aspects of the EB-1A process and providing a more comprehensive and structured response. The prompts are designed to guide the model's thought process, encouraging it to consider different perspectives and provide actionable insights. Prompt tuning involves iteratively refining the prompts based on user feedback and model performance. The prompts are continuously monitored and analyzed to identify areas for improvement. User feedback, such as ratings, comments, and suggestions, is incorporated into the prompt refinement process. Additionally, the model's outputs are evaluated using both automated metrics and human judgment to assess the effectiveness of the prompts in eliciting accurate and helpful responses.

Further, the application leverages Retrieval-Augmented Generation (RAG) to enhance the accuracy and relevance of the chatbot's responses. RAG involves augmenting the language model with a structured knowledge base that provides additional context and information specific to the EB-1A domain. The knowledge base is meticulously curated from a diverse range of sources, including EB-1A policy documents, government publications, legal resources, case studies, and success stories. The data is carefully selected to ensure its reliability, relevance, and comprehensiveness in covering various aspects of the EB-1A process. To prepare the data for efficient retrieval, a multi-stage preprocessing pipeline is employed. The raw text data undergoes cleansing, normalization, and tokenization to remove noise, inconsistencies, and irrelevant information. Named entity recognition and part-of-speech tagging techniques are applied to identify and extract key entities, such as names, organizations, and dates, which are crucial for understanding the context of the data. The preprocessed data is then structured and organized using a custom-designed ontology specifically tailored for the EB-1A domain. The ontology defines a hierarchical taxonomy of concepts, relationships, and attributes relevant to EB-1A, such as eligibility criteria, application process, evidence requirements, and success strategies. The ontology serves as a framework for categorizing and linking the data, enabling efficient retrieval, and reasoning.

The structured data is indexed using advanced retrieval techniques, such as inverted indexing and semantic hashing, to facilitate fast and accurate retrieval of relevant information. The retrieval system employs a combination of keyword-based and semantic search algorithms to identify the most pertinent pieces of information based on the user's query and context.

During the RAG process, the chatbot's language model generates an initial response based on the user's input. The model then queries the knowledge base using the generated response as a search query. The retrieval system identifies the most relevant passages from the knowledge base and provides them as additional context to the language model. The model incorporates this retrieved information into its response generation process, refining and expanding its output to provide more accurate and comprehensive guidance.

The RAG approach enables the chatbot to leverage the vast knowledge stored in the curated knowledge base, enhancing its ability to provide detailed, context-specific, and up-to-date information to users. By combining the power of the language model with the structured knowledge base, the chatbot can deliver highly informative and reliable guidance on the EB-1A process.

RAG is useful in the following situations:

Limited Knowledge: LLMs are trained on massive amounts of data, but their knowledge can still be outdated or incomplete. RAG provides access to real-time information and specialized knowledge sources.

Factual Errors: LLMs occasionally produce incorrect or misleading information (hallucinations). RAG helps ground the responses in actual facts retrieved from trusted sources.

Generic Responses: LLMs sometimes struggle to provide specific or tailored responses. RAG allows them to draw on specific examples and relevant details from the knowledge base.

For the purposes of this bot, the Next League Program's videos were transcribed into text, and provided in addition to the other text files relating to the program's mission and intel, to add to ChatGPT 4. This helped the LLM model develop grounded responses when users asked questions on EB1A, and Next League Program, and avoided hallucinations for any conversations outside of this scope.

RAG was chosen over other approaches such as long-prompting to achieve the above use case, to automate the grounding and the avoiding of user-intervention in generating longer, informational prompts for every query. The approach focused on the user was a potential EB1A aspirant getting answers to the actual EB1A or Next League Program's related questions, while RAG handles the prompt augmentation using the vectorized information from the transcribed videos.

Further, the following are the future enhancements:

1. Personalized guidance: Tailor the app's content, prompts, and nudges based on the user's background, achievements, and areas requiring improvement about EB1A criteria.

2. Progress tracking: Incorporate visual representations (e.g., progress bars, checklists) to help users track their journey and feel a sense of accomplishment as they meet various EB1A criteria.

3. Social proof: Highlight success stories and testimonials from individuals who have successfully met EB1A criteria to create a sense of confidence and motivation.

4. Reminders and notifications: Implement timely reminders and push notifications to nudge users toward completing tasks or assessments related to EB1A criteria.

5. Analytics: Stores usage analytics, such as user interactions, conversation metrics, and user feedback.

6. Subscriptions: Stores subscription information, including user ID, subscription plan, start and end dates.

7. Scalability and Reliability Implementation Strategies:
   Employ a microservices architecture to enable independent scaling of system components.
   Utilize containerization technologies like Docker for consistent, scalable deployment.
   Leverage managed database services like Amazon RDS for automated scaling and high availability.
   Implement intelligent load balancing and auto-scaling based on demand.
   Conduct regular performance testing and capacity planning to proactively accommodate growth.

The chatbot service is innovated and enhanced in continuance to target the several key areas of development to further improve user experience and system functionality. The following enhancements are planned:

Server-Side Caching Mechanism: To enhance performance and reduce making multiple calls to OpenAI, commonly asked questions are cached. Each question and its response are stored. When a user submits a prompt, the client first compares it against the cached questions. If a match is found, the response is provided directly from the cache, bypassing the server call.

Proactive Interaction with the user: The chatbot's capabilities are enhanced to initiate conversations proactively based on user behavior or predefined triggers. This will include sending reminders, updates, or promotional messages automatically. For example, if the chatbot detects that a user might benefit from writing an article based on the interaction criteria, it will suggest adding this task to the user's to-do list, thereby providing active support, and enhancing engagement.

Offline Functionality: The offline capabilities of the chatbot are planned for development. This will allow users to access frequently asked questions and receive answers without a network connection by storing some commonly asked question topics. By storing a small subset of encrypted FAQs on the client-side, users will be able to interact with the chatbot regardless of their internet connectivity.

Enhanced Security Future updates will focus on implementing more advanced encryption techniques for data storage and transmission. This will also include supporting Google or Apple login.

Automatic Question and Answer Grouping: The server will automatically divide the questions and the corresponding answer into 11 categories. Ten of these categories are dedicated to various aspects of EB1A, while the 11th category encompasses general questions, such as fees and other non-specific inquiries. This structured approach enhances navigability and user experience.

Further, The Reliability framework cited from "Reliability Measurement: from Theory to Practice" [1] will be applied to provide a structure to the data reliability and integrity across various stages-all the way from backend systems to the interaction with the large language model, to improve the reliability, performance, and availability of the chatbot. This would involve an iterative monitoring and measurement of the application with respect to the network, API usage, user traffic, infrastructure monitoring.

Further, caching strategies will be implemented to improve performance and reduce the load on the LLM backend as user traffic increases and around 100,000 requests are reached. By clustering commonly asked questions and caching the responses, we can avoid unnecessary calls to the backend and serve the front-end more efficiently. This can be achieved using caching technologies like REDIS.

Further, the following are the policies for cache eviction:

The cache eviction policies are chosen appropriately to determine when to expire or evict data from the cache. A poor cache eviction policy can be detrimental, as it may result in the application making two calls: one to the cache and another to the database in case of a cache miss. The following include the considerations for some common eviction policies:

Least Recently Used (LRU): Purges cold data that hasn't been accessed recently. Widely used but may not always be the most effective.

Least Frequently Used (LFU): Removes the least frequently accessed data. Used in scenarios like mobile keyboard caches.

Most Recently Used (MRU): Evicts the most recently used data. Suitable for applications like Tinder's profile matching.

Cache Placement

The following will evaluate two main approaches to cache placement:

1. Web Application Server's RAM: Simple and fast, but less reliable. If the application server crashes, the cache is lost. Requires sticky load balancing.

2. Separate Cache Server/Storage: More complex implementation but offers better scalability and reliability. Allows independent scaling of cache and backend databases.

Further, the appropriate cache types are chosen based on the following requirements:

Read-through Cache: Lazy caching approach where the application reads from the cache. In case of a cache miss, the cache loads the requested object from the database and returns it to the application.

Write-through Cache: The application writes to both the cache and the database. Ensures better synchronization between cache and database but introduces additional load on the application.

Write-behind Cache: The application writes to the cache, and the cache eventually writes to the database. Provides better performance but may lead to eventual consistency issues and data staleness.

Further, the cache management best practices are followed to ensure optimal caching behavior: Cache Concurrency: Consider optimistic or pessimistic concurrency control when multiple applications or services use the same cache. Improved Cache Availability: Implement a circuit breaker pattern with multiple layers of caches. Use active-passive cache failover or clustering for better availability. Partitioning in Redis: Choose between server-side partitioning, client-side partitioning, or using a proxy for routing client requests to the appropriate Redis cluster node. By implementing these caching strategies and best practices, the bot's performance and scalability will be enhanced as it handles high user traffic. The factors like cache eviction policies, placement, types, and management techniques are carefully considered to ensure optimal caching behavior and avoiding pitfalls like thrashing and data staleness.

Further, it would be imperative to ensure data backups, availability, and reliability since MYSQL is used as the backend database to capture the user activity, prompts, and history. The cloud-native managed databases such as Cloud SQL or Relational Data Store to use HA (High Availability) will be used. The sample architecture of the HA configuration that is planned to be used in the future is (https://cloud.google.com/sql/docs/mysql/high-availability)

For read availability and traffic, read replicas would be used to avoid too much write and read traffic on the write master. These two approaches-read replication and HA would help in achieving over 99.99% availability with minimal downtime.

Further, for better scalability and availability, the backend code which runs on Hostinger, would be converted into a docker image to run on Kubernetes. Kubernetes, an open-source container orchestration platform, provides several features that contribute to the scalability and availability of applications. Kubernetes adds scalability and availability as follows:

Horizontal Scaling (Scaling Out):

Kubernetes allows the scaling of applications horizontally by running multiple replicas of the same container across different nodes in the cluster.

The number of replicas can be easily increased or decreased based on the demand or load on the application, ensuring that sufficient resources are available to handle the workload.

This horizontal scaling capability helps applications handle increased traffic or load without experiencing downtime or performance degradation.

Load Balancing:

Kubernetes includes a built-in load-balancing mechanism that distributes incoming traffic across the available replicas of an application.

It automatically routes requests to healthy instances, ensuring the load is evenly distributed and preventing any single instance from becoming overwhelmed.

This load-balancing feature enhances the availability of the application by reducing the risk of individual instances becoming overloaded.

Self-Healing:

Kubernetes continuously monitors the health of application instances (pods) and automatically restarts or reschedules them if they fail or become unresponsive.

This self-healing capability ensures that the desired number of replicas is always maintained and the application remains available even during failures.

Rolling Updates and Rollbacks:

Kubernetes supports rolling updates, which allows the deployment of new versions of the application gradually without causing downtime.

If issues arise during the update process, Kubernetes can automatically roll back to the previous stable version, minimizing the impact on application availability.

Autoscaling:

Kubernetes provides built-in autoscaling capabilities that automatically adjust the number of replicas based on predefined metrics, such as CPU utilization or custom metrics.

This feature allows applications to scale up or down dynamically based on the current demand, optimizing resource utilization, and ensuring that the application remains responsive under varying load conditions.

High Availability:

Kubernetes can be configured to run in a highly available mode, with multiple master nodes and load balancing across them.

This ensures that if one master node fails, the control plane remains operational, and the cluster continues to function without interruption.

Further, the real-time RAG allows the capability to add real-time videos and documents to the vector database, enrich the embeddings, and model fine-tuning using QLoRA as and when needed.

The real time RAG depicts a system architecture for real-time data engineering and machine learning model training/fine-tuning. Here's a breakdown of the different components:

1. Real-time data engineering:

API/Web sources: Incoming data streams from various APIs and web sources.

Streaming Service: Handles the real-time data streams.

Embedding Model: Converts the raw data into numerical embeddings or representations.

Embedding Database: Stores the generated embeddings.

Model Registry: A centralized repository for managing and serving the models.

Restful API: Provides an interface for the UI/Front End (e.g., Bot) to interact with the system.

Inference: The process of using the models to make predictions or generate outputs based on the input data.

2. LLM (Large Language Model) Training/Fine-tuning:

LLM model: The base language model that will be fine-tuned.

Generate Q/A: A process to generate question-answer pairs from the embeddings or other data sources.

Q/A dataset for fine-tuning: The generated question-answer pairs are used as a dataset to fine-tune the LLM model.

Model Fine-tuning (QLoRa): The process of fine-tuning the LLM model using the Q/A dataset, potentially using techniques like Quantization and LoRA (Low-Rank Adaptation).

Experiment Tracking: Tracking and monitoring the fine-tuning experiments and their performance.

Further, the EB1A Xpert BOT system architecture consists of three main components: a mobile application frontend, a backend server, and integration with the OpenAI Assistants API. The mobile application, developed using Swift and SwiftUI, provides a user-friendly interface for interacting with the chatbot. The backend server, built with Node.js, handles user authentication, request processing, database interactions, and communication with the OpenAI Assistants API. The system employs a RESTful API for seamless communication between the frontend and backend components.

The backend server incorporates a queue and worker system to efficiently handle high volumes of requests and prevent server overload. The worker system is responsible for prompt engineering, managing OpenAI threads, and fetching responses from the language model. An exponential backoff mechanism is implemented to gracefully handle rate limiting issues from the OpenAI API.

The system utilizes a MySQL database to store user information, conversation threads, and prompt counts. The database schema follows the Third Normal Form (3NF) to minimize data redundancy and ensure data integrity.

Further, the scalability aspects of the EB1A Xpert BOT are considered, focusing on how the system's architecture and infrastructure are designed to handle a growing user base and increased demand.

Scalability is a critical consideration in the development of the EB1A Xpert BOT, as the system needs to be able to accommodate an increasing number of users and requests without compromising performance, reliability, or user experience. The system's scalability is achieved through a combination of architectural decisions, infrastructure setup, and deployment strategies.

1. Microservices Architecture: The EB1A Xpert BOT follows a microservices architecture, which is a design approach that structures the system as a collection of loosely coupled, independently deployable services. Each microservice is responsible for a specific function or capability of the system, such as user authentication, prompt engineering, or API integration. The microservices architecture provides several scalability benefits. First, it allows for horizontal scaling, where individual microservices can be scaled independently based on their specific resource requirements and usage patterns. This means that if a particular microservice experiences high demand, additional instances of that microservice can be deployed to handle the increased load without affecting the other parts of the system.

Second, the microservices architecture enables better resource utilization and optimization. Each microservice can be deployed on the most suitable infrastructure based on its specific requirements, such as CPU, memory, or storage. This allows for efficient allocation of resources and prevents over-provisioning or under-utilization of resources.

Third, the microservices architecture promotes fault isolation and resilience. If one microservice fails or experiences issues, it does not necessarily impact the entire system. Other microservices can continue to operate independently, minimizing the overall impact on the system's availability and performance.

2. Containerization and Orchestration: To facilitate the deployment, scaling, and management of microservices, the EB1A Xpert BOT utilizes containerization technologies like Docker. Containerization provides a lightweight and portable way to package microservices along with their dependencies, ensuring consistency across different environments.

The containerized microservices are then orchestrated using a container orchestration platform like Kubernetes. Kubernetes is an open-source system that automates the deployment, scaling, and management of containerized applications. It provides a declarative way to define the desired state of the system, including the number of replicas for each microservice, resource constraints, and scaling policies.

Kubernetes enables automatic scaling of microservices based on predefined metrics or custom scaling policies. For example, the system can be configured to automatically scale up the number of instances of a microservice when the CPU utilization exceeds a certain threshold, ensuring that the system can handle increased load without manual intervention.

Kubernetes also provides built-in mechanisms for load balancing, service discovery, and self-healing. It can automatically distribute incoming requests across multiple instances of a microservice, ensuring even distribution of load. If a microservice instance fails, Kubernetes can automatically detect the failure and replace it with a new instance, maintaining the desired state of the system.

3. Elastic Infrastructure: To support the scalability of the EB1A Xpert BOT, the system leverages elastic infrastructure provided by cloud platforms like Amazon Web Services (AWS), Google Cloud Platform (GCP), or Microsoft Azure. These cloud platforms offer a wide range of scalable services and resources that can be provisioned and scaled on-demand.

The EB1A Xpert BOT utilizes various cloud services to support its scalability needs. For example, it may use auto-scaling groups or virtual machine scale sets to automatically adjust the number of compute instances based on the incoming traffic. This allows the system to dynamically scale up or down the infrastructure resources based on the actual demand.

The system also utilizes scalable storage services like Amazon S3 or Google Cloud Storage to store and retrieve large volumes of data efficiently. These storage services provide high scalability, durability, and availability, ensuring that the system can handle increasing data storage requirements without performance bottlenecks.

For data persistence and storage, the EB1A Xpert BOT may employ scalable database solutions like Amazon RDS, Google Cloud SQL, or Azure Database. These managed database services offer automatic scaling, replication, and failover capabilities, ensuring that the database tier can handle increased read and write loads while maintaining data consistency and availability.

4. Caching and Performance Optimization: To further enhance the scalability and performance of the EB1A Xpert BOT, the system incorporates caching mechanisms at various levels. Caching helps to reduce the load on backend services and improve response times by storing frequently accessed data in fast and easily accessible cache stores.

The system may employ in-memory caching solutions like Redis or Memcached to store frequently accessed data, such as user sessions, authentication tokens, or commonly used API responses. By serving data from the cache, the system can avoid making repetitive and expensive calls to the backend services, reducing latency, and improving overall performance.

Additionally, the system may implement content delivery networks (CDNs) to cache and serve static assets, such as images, videos, or HTML files, closer to the users' locations. CDNs distribute the content across geographically dispersed servers, reducing the distance and latency between the users and the content. This ensures faster delivery of static assets and improves the overall user experience, especially for users located far from the primary server.

5. Monitoring and Auto-scaling: To ensure the scalability and performance of the EB1A Xpert BOT, the system incorporates robust monitoring and auto-scaling mechanisms. Monitoring tools like Prometheus, Grafana, or cloud-native monitoring solutions are used to collect and visualize real-time metrics and logs from various components of the system.

These monitoring tools provide insights into key performance indicators (KPIs) such as response times, error rates, resource utilization, and user metrics. The system administrators can set up alerts and notifications based on predefined thresholds or anomalies, enabling proactive identification and resolution of performance issues.

Auto-scaling policies are defined based on the monitoring metrics and business requirements. For example, the system can be configured to automatically scale up the number of microservice instances when the response times exceed a certain threshold or when the number of concurrent users reaches a specific limit. Similarly, the system can scale down the resources during periods of low demand to optimize costs and resource utilization.

The combination of monitoring and auto-scaling ensures that the EB1A Xpert BOT can dynamically adapt to changing workloads and maintain optimal performance and scalability. It allows the system to handle sudden spikes in traffic, accommodate a growing user base, and ensure a consistent user experience even under high load conditions.

6. Continuous Integration and Continuous Deployment (CI/CD): To support the scalability and agility of the EB1A Xpert BOT, a Continuous Integration and Continuous Deployment (CI/CD) pipeline is adopted. CI/CD is a set of practices and tools that automate the build, testing, and deployment processes of the system.

The CI/CD pipeline is triggered whenever changes are made to the system's codebase. It automatically builds the updated microservices, runs automated tests to ensure the correctness and compatibility of the changes, and packages the microservices into deployable artifacts (e.g., Docker containers).

Once the artifacts are ready, the CD part of the pipeline automatically deploys them to the production environment using tools like Kubernetes or cloud-native deployment services. The deployment process is designed to be seamless and minimally disruptive, allowing for zero-downtime updates and rollbacks if necessary.

The CI/CD pipeline enables rapid and frequent releases of new features, bug fixes, and performance improvements. It ensures that the system can evolve and adapt quickly to changing requirements and user needs. The automated nature of the pipeline reduces the risk of human errors and ensures consistency and reliability across deployments.

7. Scalability Testing and Capacity Planning: To validate the scalability of the EB1A Xpert BOT and ensure it can handle the expected workload, regular scalability testing and capacity planning exercises are conducted.

Scalability testing involves simulating various load scenarios and measuring the system's performance and resource utilization under different levels of concurrency and traffic. Tools like Apache JMeter, Gatling, or Locust can be used to generate synthetic load and analyze the system's behavior.

The scalability tests help identify potential bottlenecks, performance degradations, or resource limitations. The results of the tests are used to fine-tune the system's configuration, optimize resource allocation, and make necessary architectural improvements.

Capacity planning involves estimating the resource requirements of the system based on the projected user growth and usage patterns. By analyzing historical data, user trends, and business forecasts, the expected workload is predicted and the necessary infrastructure capacity to support that workload is determined.

Capacity planning helps in proactively provisioning and scaling the infrastructure to meet the anticipated demand. It ensures that the system has sufficient resources to handle the expected user base and can scale seamlessly as the user base grows over time.

The scalability testing and capacity planning processes are iterative and ongoing. As the system evolves and new features are introduced, the system's performance is continuously monitored, scalability tests are conducted, and the capacity planning is adjusted accordingly. This proactive approach ensures that the EB1A Xpert BOT can scale effectively and maintain optimal performance as the user base and usage patterns change.

In conclusion, the scalability of the EB1A Xpert BOT is achieved through a combination of architectural decisions, infrastructure setup, and deployment strategies. The microservices architecture, containerization, and orchestration using Kubernetes provide the foundation for horizontal scaling and efficient resource utilization. The elastic infrastructure, caching mechanisms, and performance optimizations further enhance the system's scalability and responsiveness.

Continuous monitoring, auto-scaling, and a robust CI/CD pipeline ensure that the system can dynamically adapt to changing workloads and maintain optimal performance. Regular scalability testing and capacity planning exercises validate the system's ability to handle the expected user base and usage patterns.

By designing the EB1A Xpert BOT with scalability in mind from the ground up, accommodation of a growing user base by the system is ensured, increased demand is handled, and delivery of a seamless and responsive user experience is ensured. As the system continues to evolve and expand, the scalability measures in place will enable the EB1A Xpert BOT to scale effectively and meet the needs of its users in the long run.

Prompt engineering is a critical component of the EB1A Xpert BOT's architecture, as it optimizes user input for the OpenAI API to enhance the accuracy and relevance of generated responses. The system employs advanced techniques such as token management, context framing, dynamic prompt generation, metadata tagging, and context-aware heuristics to guide the language model towards producing high-quality outputs.

1. Token Management: Token management is a fundamental aspect of prompt engineering, as it ensures efficient handling of input and output tokens within the constraints of the language model. The EB1A Xpert BOT utilizes a tokenization algorithm to break down user input into meaningful units, such as words or sub-words, depending on the specific language model being used (e.g., GPT-3 or GPT-4). The system employs a token-counting mechanism to keep track of the number of tokens in the input and output, ensuring that the total token count remains within the model's acceptable range. This is crucial for maintaining the coherence and completeness of generated responses while avoiding truncation or degradation of output quality.

2. Context Framing: Context framing involves providing relevant background information to the language model to guide it towards generating responses that align with the desired context. The EB1A Xpert BOT achieves this by constructing prompts that include key details about the user's background, intent, and specific query. For instance, if a user asks about highlighting their research publications in an EB-1A application, the system will frame the prompt with information such as the user's field of expertise, publication history, and the intent to showcase research impact. This context framing helps the model produce a more targeted and relevant response, taking into account the user's unique circumstances and objectives.

3. Dynamic Prompt Generation: Dynamic prompt generation is a technique that enables the EB1A Xpert BOT to create customized prompts based on user input and conversational context. The system employs natural language processing (NLP) algorithms to analyze user queries and extract key entities, intents, and sentiments. These extracted elements are then used to generate prompts that are tailored to the specific user input and the current state of the conversation. For example, if a user asks a follow-up question related to a previous topic, the system will dynamically generate a prompt that incorporates the relevant context from the earlier exchange, ensuring a smooth and coherent flow of the conversation.

4. Metadata Tagging: Metadata tagging is a technique used to provide structured information to the language model, enabling it to generate more accurate and contextually relevant responses. The EB1A Xpert BOT incorporates metadata tags in its prompts to convey additional details such as user preferences, prior interactions, and domain-specific knowledge. These tags are typically represented in a standardized format, such as XML or JSON, and are parsed by the language model during the generation process. For instance, a prompt may include tags like <user_context>, <intent>, or <domain_knowledge> to provide the model with explicit cues about the user's background, objectives, and the relevant knowledge domain. By leveraging metadata tagging, the system can fine-tune its responses to better address the user's specific needs and expectations.

5. Context-Aware Heuristics: Context-aware heuristics are a set of rules and algorithms employed by the EB1A Xpert BOT to analyze user input and generate prompts that capture the nuances and intent of the user's query. These heuristics consider various factors such as the semantic meaning of the input, the presence of keywords or phrases, and the overall structure and tone of the query. By applying these heuristics, the system can infer the user's underlying intent and generate prompts that are more likely to elicit relevant and helpful responses from the language model.

One example of a context-aware heuristic is the use of semantic similarity measures, such as cosine similarity or word embeddings, to identify the main themes and topics in the user's input. The system can then generate prompts that emphasize these key aspects, ensuring that the generated response is focused on the most pertinent information. Another heuristic involves detecting the presence of specific question types, such as factual, explanatory, or evaluative questions, and adapting the prompt structure accordingly. For instance, if the user asks an evaluative question, the prompt may include instructions for the model to provide a well-reasoned opinion or assessment based on the available evidence.

The EB1A Xpert BOT's prompt engineering techniques are designed to work in synergy, creating a robust and effective system for generating high-quality responses. By combining token management, context framing, dynamic prompt generation, metadata tagging, and context-aware heuristics, the system can optimize user input and guide the language model towards producing accurate, relevant, and contextually appropriate outputs.

For illustrating the effectiveness of these techniques, an example scenario is considered where a user seeks guidance on showcasing their research impact in an EB-1A application:

User Input: "I have published several research papers in top-tier journals in the field of computer science. How can I effectively highlight the impact of my research in my EB-1A application?"

The EB1A Xpert BOT's prompt engineering process would unfold as follows:

1. Token Management: The system tokenizes the user input and ensures that the total token count, including the generated prompt and expected output, falls within the acceptable range of the language model.

2. Context Framing: The system constructs a prompt that includes relevant background information, such as the user's field of expertise (computer science) and publication history (top-tier journals).

3. Dynamic Prompt Generation: The system analyzes the user's query and identifies the key intent (highlighting research impact) and the specific domain (EB-1A application). It generates a tailored prompt that addresses these aspects.

4. Metadata Tagging: The prompt incorporates metadata tags to provide structured information to the language model, such as <user_context>Computer Science, Top-tier journal publications</user_context> and <intent>Highlighting research impact in EB-1A application</intent>.

5. Context-Aware Heuristics: The system applies heuristics to capture the nuances of the user's query, such as recognizing the emphasis on "impact" and the need for strategies to effectively showcase research achievements.

The resulting prompt may look something like this

[User Context]
Field: Computer Science
Publications: Top-tier journals
Intent: Highlighting research impact in EB-1A application
[Prompt]
Analyze the user's research publications and provide guidance on effectively showcasing their impact and significance in the EB-1A application. Consider factors such as:
Citation count and impact factor of the journals
Novel contributions and advancements made in the field
Practical applications and real-world implications of the research
Recognition and awards received for the research
Suggest specific strategies for presenting the publications in the application narrative and supporting evidence, such as:
Emphasizing the quantitative measures of impact (e.g., citation count, impact factor)
Highlighting the key findings and their significance in the field
Providing concrete examples of how the research has been applied or influenced further studies
Including testimonials or letters of recommendation from experts in the field
Ensure that the response is clear, concise, and tailored to the user's specific context and objectives. By processing the user's input through these prompt engineering techniques, the EB1A Xpert BOT can generate a prompt that effectively captures the relevant context, user intent, and specific requirements of the query. This optimized prompt is then passed to the language model, which generates a response that is more likely to be accurate, informative, and helpful to the user.

The scientific approach to prompt engineering employed by the EB1A Xpert BOT ensures that the system can handle a wide range of user queries and generate high-quality responses that are tailored to each user's unique needs and circumstances. By continuously refining and updating these techniques based on user feedback and advancements in NLP research, the system can maintain its effectiveness and relevance in assisting EB-1A applicants with their complex immigration challenges.

Further, Data privacy and security are paramount concerns in the development of the EB1A Xpert BOT, as the system handles sensitive user information and must comply with relevant regulations such as the General Data Protection Regulation (GDPR) and the Health Insurance Portability and Accountability Act (HIPAA). The EB1A Xpert BOT employs a comprehensive set of technical and organizational measures to ensure the confidentiality, integrity, and availability of user data throughout its lifecycle.

1. Data Encryption: Data encryption is a fundamental security measure that ensures the confidentiality of user information by converting it into a coded format that is unreadable without the corresponding decryption key. The EB1A Xpert BOT utilizes industry-standard encryption algorithms, such as the Advanced Encryption Standard (AES) with a 256-bit key size, to protect user data both at rest and in transit.

When user data is stored in the system's database (data at rest), it is encrypted using a strong symmetric encryption algorithm like AES-256. The encryption keys are securely generated, managed, and stored using a key management system (KMS) that follows best practices such as key rotation and secure key storage. The KMS ensures that the encryption keys are protected from unauthorized access and are only accessible to authorized system components and personnel.

2. When user data is transmitted between the EB1A Xpert BOT's components or between the system and external entities (data in transit), it is encrypted using secure communication protocols like Transport Layer Security (TLS) or its predecessor, Secure Sockets Layer (SSL). These protocols establish an encrypted channel between the communicating parties, preventing unauthorized interception or tampering of the data during transmission. The EB1A Xpert BOT is configured to use strong TLS configurations, such as TLS 1.2 or higher, with secure cipher suites that provide forward secrecy and protect against known vulnerabilities.

Access Controls: Access controls are security measures that restrict access to user data and system resources to authorized individuals and processes. The EB1A Xpert BOT implements a role-based access control (RBAC) model, which defines different user roles with specific permissions and privileges based on the principle of least privilege. This ensures that users and system components only have access to the data and functionalities necessary for their intended purposes.

The RBAC model is enforced through authentication and authorization mechanisms. Authentication verifies the identity of users or system components requesting access to the EB1A Xpert BOT's resources. This is typically achieved through secure authentication methods such as username/password combinations, multi-factor authentication (MFA), or cryptographic authentication protocols like OAuth 2.0 or OpenID Connect. The system maintains a secure user directory or identity provider that stores user credentials and handles the authentication process.

Authorization determines what actions and resources an authenticated user or system component is allowed to access. The EB1A Xpert BOT defines granular access control policies that specify the permissions associated with each user role. These policies are enforced by the system's authorization engine, which evaluates access requests against the defined policies and grants or denies access accordingly. The authorization engine may utilize technologies like JSON Web Tokens (JWTs) or Security Assertion Markup.

3. Compliance with Regulations: The EB1A Xpert BOT is designed to comply with relevant data protection regulations, such as GDPR and HIPAA, which establish strict requirements for the collection, processing, storage, and transfer of personal data. Compliance with these regulations involves a combination of technical and organizational measures.

From a technical perspective, the EB1A Xpert BOT implements data protection by design and by default principles. This means that privacy and security considerations are integrated into the system's architecture and development process from the outset, rather than being an afterthought. The system employs techniques like data minimization (collecting only the necessary data), pseudonymization (replacing personally identifiable information with pseudonyms), and data retention limits (deleting data when no longer needed) to minimize the risk of data breaches and unauthorized access.

The EB1A Xpert BOT is developed by following strict data governance policies and procedures. This includes conducting regular privacy impact assessments (PIAs) to identify and mitigate potential privacy risks, maintaining comprehensive documentation of data processing activities, and providing transparent privacy notices to users. Data processing agreements (DPAs) with any third-party service providers or data processors are established to ensure that they adhere to the same data protection standards.

4. Security Audits and Testing: To maintain a high level of security and identify potential vulnerabilities, the EB1A Xpert BOT undergoes regular security audits and testing. This involves a combination of internal and external assessments.

Internal security audits are conducted to review the system's security controls, configurations, and practices. These audits may include code reviews, vulnerability scans, and penetration testing to identify and remediate any weaknesses in the system's security posture. The audits follow established security standards and best practices, such as the NIST Cybersecurity Framework or the OWASP Top 10, to ensure a comprehensive and systematic approach to security assessment.

External security audits are performed by independent third-party security firms to provide an objective evaluation of the EB1A Xpert BOT's security. These audits may include penetration testing, vulnerability assessments, and compliance audits against relevant standards and regulations. The external auditors provide detailed reports on their findings, including any identified vulnerabilities, their severity, and recommendations for remediation. Any security issues and implementation of the necessary fixes and improvements are addressed.

In addition to periodic audits, the EB1A Xpert BOT undergoes continuous security testing and monitoring. This involves the use of automated security tools, such as static code analysis, dynamic application security testing (DAST), and runtime application self-protection (RASP), to constantly scan the system for potential vulnerabilities and anomalies. These tools are integrated into the development and deployment pipelines to ensure that security testing is performed regularly and consistently.

5. Incident Response and Business Continuity: Despite the robust security measures in place, it is essential to have well-defined incident response and business continuity plans to effectively handle potential security breaches or system disruptions. A comprehensive incident response plan is established that outlines the procedures to be followed in the event of a security incident.

The incident response plan includes steps for detecting, analyzing, containing, and recovering from security incidents. It defines clear roles and responsibilities for the incident response team, which typically includes security experts, developers, and management personnel. The plan also specifies communication protocols for notifying relevant stakeholders, such as users, regulatory authorities, and law enforcement agencies, in case of a data breach or other significant security incident.

To minimize the impact of potential system disruptions, the EB1A Xpert BOT implements business continuity and disaster recovery mechanisms. This includes regular data backups, redundant infrastructure, and failover mechanisms to ensure the availability and integrity of the system and its data. Periodic testing and simulations of disaster recovery scenarios are conducted to validate the effectiveness of the business continuity plan and identify areas for improvement.

The scientific approach to data privacy and security employed by the EB1A Xpert BOT ensures that user data is protected throughout its lifecycle, from collection and storage to processing and deletion. By implementing strong encryption, access controls, compliance measures, regular audits and testing, and robust incident response and business continuity plans, the system maintains a high level of security and resilience against potential threats and vulnerabilities.

As the threat landscape evolves and new security challenges emerge, the EB1A Xpert BOT is continuously improved and updated with the system's security measures. This involves staying up to date with the latest security research, industry best practices, and regulatory requirements, and incorporating them into the system's design and operations. By adopting a proactive and adaptive approach to data privacy and security, the EB1A Xpert BOT can provide its users with a secure and trustworthy platform for navigating the complex world of immigration and self-discovery.

Further, The development of the EB1A Xpert BOT adheres to ethical principles and responsible AI practices. The system is designed to provide fair and unbiased guidance to all users, irrespective of their background or demographic characteristics. Transparency is maintained by clearly communicating the limitations and capabilities of the AI system to users.

Accountability measures are in place to ensure that the system's decision-making process is auditable and can be reviewed for fairness and accuracy. Regular monitoring and evaluation are conducted to identify and mitigate any potential biases or unintended consequences.

The executive order [17] provides guidance and directives that are directly relevant to the development of the EB1A Xpert BOT in several ways:

1. Principles and priorities: The order lays out guiding principles for the development and use of AI, such as ensuring safety and security, promoting responsible innovation, supporting American workers, advancing equity and civil rights, and protecting privacy. These principles align with the EB1A Xpert BOT's focus on responsible AI development, data privacy, and ethical considerations.

2. Safety and security: The order directs agencies to develop guidelines, standards, and best practices for AI safety and security. It emphasizes the importance of AI red-teaming, testing environments, and risk management practices. These aspects are reflected in the EB1A Xpert BOT's architecture, which incorporates security measures, data encryption, and error handling to ensure the safe and secure use of the chatbot.

3. Protecting privacy: The order emphasizes the need to mitigate privacy risks exacerbated by AI and directs agencies to use privacy-enhancing technologies (PETs) where appropriate. The EB1A Xpert BOT's development process prioritizes data privacy and security, implementing encryption algorithms, access controls, and compliance with relevant regulations like GDPR and HIPAA.

4. Advancing Federal Government use of AI: The order provides guidance on AI management, risk management practices, and increasing AI talent in government. It encourages agencies to use AI responsibly and securely, especially in the context of generative AI. While not directly applicable to the EB1A Xpert BOT as a private-sector application, these guidelines can inform best practices for responsible AI development and deployment.

5. Strengthening American leadership abroad: The order directs efforts to expand international engagements, establish frameworks for managing AI risks and benefits, and promote responsible global technical standards for AI development and use. As the EB1A Xpert BOT aims to assist individuals seeking to live and work in the United States, aligning with these international efforts can help ensure the chatbot's compliance with global standards and best practices.

While the executive order is primarily focused on Federal Government agencies, many of its principles, guidelines, and directives are relevant to the private sector and can inform the responsible development and deployment of AI applications like the EB1A Xpert BOT. By adhering to the order's emphasis on safety, security, privacy, equity, and responsible innovation, the chatbot's development process can align with the broader policy framework outlined in the order.

Further, the EB1A Xpert BOT incorporates a robust user feedback loop to continuously improve its performance and user experience. The system employs advanced mechanisms, such as real-time feedback integration, sentiment analysis, and adaptive learning algorithms, to analyze and incorporate user feedback effectively. User feedback is collected through various channels, including in-app ratings, user comments, and direct communication. The feedback is analyzed at both macro and micro levels, using techniques such as clustering similar feedback for trend analysis and implementing user-driven modifications to the conversational pathways. A/B testing is conducted to evaluate the effectiveness of different conversational strategies, prompt variations, and user interface elements. The system undergoes iterative refinement based on user interactions and feedback, optimizing its effectiveness and responsiveness over time. For example, if multiple users provide feedback indicating confusion or dissatisfaction with a particular response or conversational flow, the system analyzes the feedback and identifies common patterns. The relevant prompts, conversational pathways, or knowledge base content are modified to address the identified issues. The updated system is deployed, and its performance is monitored closely to assess the impact of the changes.

Further, the following are the long-term visions and the future developments:

Expand support beyond EB-1A to other visa categories and immigration processes.

Integrate additional data sources to enhance expertise modeling (e.g., professional databases, academic repositories).

Develop advanced natural language processing capabilities for more nuanced evaluation of qualitative criteria.

Offer personalized recommendations and guidance to help individuals strengthen their profiles.

Explore partnerships with legal and professional organizations to enrich the knowledge base.

Further, The EB1A Xpert BOT represents a significant advancement in the field of immigration consulting, leveraging AI technology and personalized guidance to assist individuals in their pursuit of the EB-1A Green Card. The system's architecture, prompt engineering techniques, and responsible AI practices ensure a high level of accuracy, relevance, and fairness in its interactions with users.

By providing tailored insights, strategies, and support for personal growth and self-discovery, the EB1A Xpert BOT aims to empower applicants to build stronger EB-1A cases and achieve their dreams of living and working in the United States. The continuous improvement process, driven by user feedback and iterative refinement, ensures that the system remains responsive to the evolving needs and challenges of EB-1A applicants.

As the EB1A Xpert BOT continues to develop and expand its capabilities, it has the potential to revolutionize the immigration consulting industry, making high-quality, personalized guidance accessible to a wider audience, and contributing to the overall success and diversity of the U.S. workforce.

Further, the present disclosure describes an application. Further, the application application uses #15386C (deep blue) as a theme. The color is selected to help EB1A users feel encouraged and trust the brand. It also represents the color of the USA's flag, which motivates them to succeed soon. We have used The Inter font family throughout the application to increase the legibility, clean appearance, and ability to ensure readability across various screen sizes and devices, which makes the complex USCIS laws and details easy for users to read. The clean and modern designs contribute to the application's overall aesthetic while ensuring users can easily read and comprehend the content.

Further, the present disclosure describes a persona for an EB1Xert application. Further, the persona gives a human touch to an EB1Xert application, making users feel like they are talking to one of the EB1A achievers.

Further, the present disclosure describes a method for enhancing user engagement through proactive interactions in a chatbot application comprising:

Monitoring user behavior and interactions within the chatbot interface to identify specific triggers and intents.

Utilizing a set of predefined rules to initiate conversations based on these triggers, which may include sending reminders, updates, or promotional messages to the user.

Specifically, if a user interaction suggests a need for writing an article based on the criteria discussed during the interaction, prompting the user to consider adding this task to their to-do list, thereby assisting in task management, and ensuring that the user feels actively supported and guided.

Further, the present disclosure describes a performance enhancement technique for chatbot applications using caching of commonly asked questions, comprising:

Clustering of questions based on criteria using machine learning techniques, such as K-means clustering.

Storing the clustered questions and their corresponding answers in a cache.

Upon receiving a user query, it compares it against the cached questions, and if a match is found, it retrieves the answer from the cache, bypassing the need to send the query to the backend server.

Further, the present disclosure describes an offline interaction mode for chatbot applications comprising:

Storing a subset of frequently asked questions (FAQs) and their corresponding answers in an encrypted format on the client side.

Enabling the client to autonomously respond to user queries offline by: Identifying keywords in the user's question, searching the stored FAQs for matches based on these keywords and displaying relevant FAQs and answers that match the criteria, especially when the query is related to common topics such as salary requirements, even if exact matches are not found due to network unavailability.

Enabling users to interact with the chatbot and receive answers to common questions even when there is no internet connectivity or network availability.

Providing a seamless transition between offline and online modes, where any new queries or interactions in offline mode are queued and sent to the backend server once connectivity is restored.

FIG. 1 is an illustration of an online platform 100 consistent with various embodiments of the present disclosure. By way of non-limiting example, the online platform 100 to facilitate conversational interaction with users to help the users may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 2200.

Figure 2:
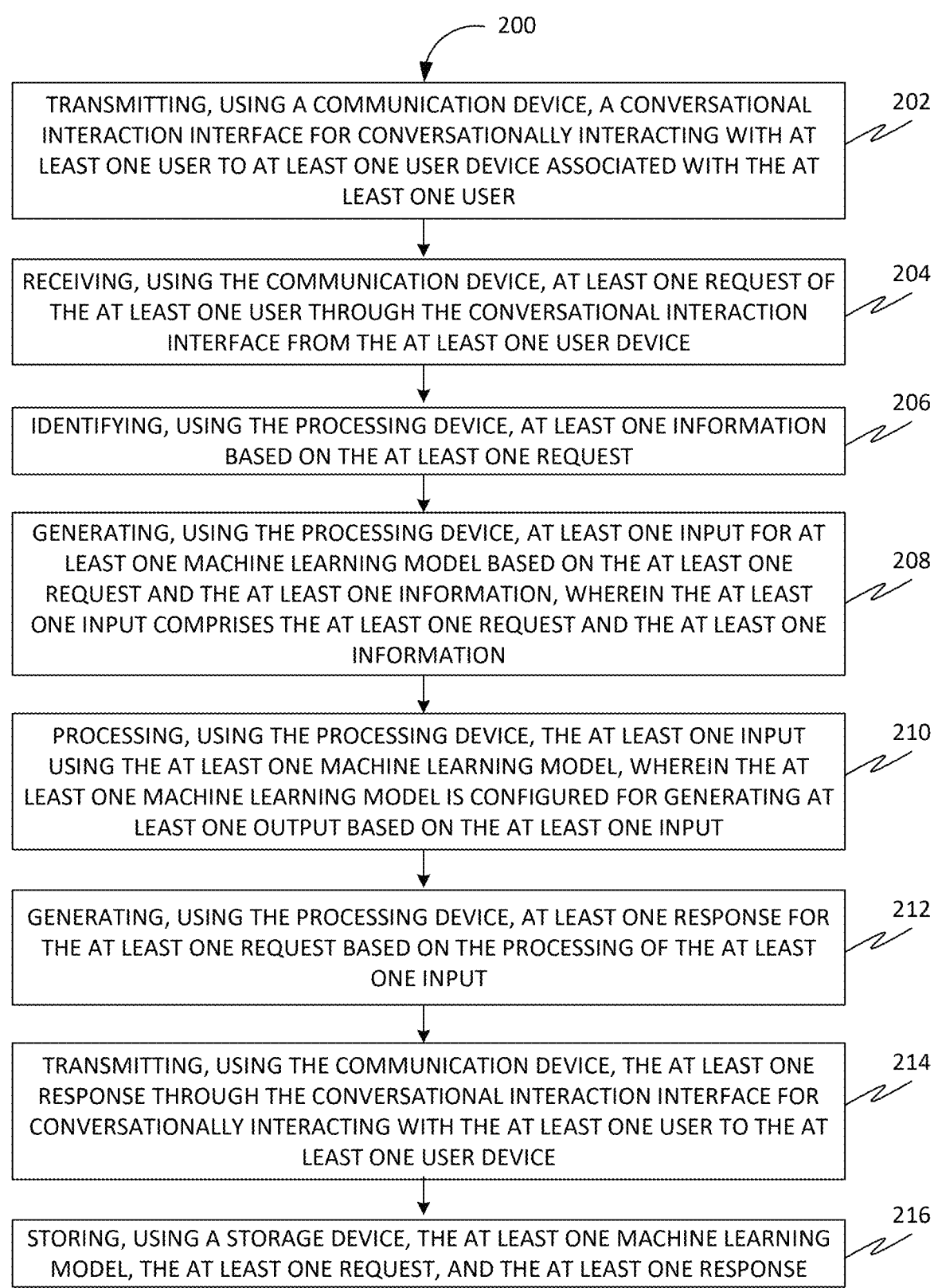
FIG. 2 is a flowchart of a method 200 for facilitating conversational interaction with users to help the users, in accordance with some embodiments.

FIG. 2 is a flowchart of a method 200 for facilitating conversational interaction with users to help the users, in accordance with some embodiments. Accordingly, at 202, the method 200 may include transmitting, using a communication device, a conversational interaction interface for conversationally interacting with at least one user to at least one user device associated with the at least one user. Further, the conversational interaction interface may include a user interface, a chatbot interface, a mobile interface, a desktop interface, a computing device interface, etc. Further, the conversational interaction interface may be presented on the at least one user device. Further, the at least one user device may include a computing device, a client device, a mobile, a smartphone, a laptop, a desktop, etc. Further, the at least one user may include an individual, a person, etc. Further, the conversational interaction interface may be associated with a chatbot. Further, the chatbot may include an EB1A Xpert chatbot.

Further, at 204, the method 200 may include receiving, using the communication device, at least one request of the at least one user through the conversational interaction interface from the at least one user device. Further, the at least one request may include a query, a question, an input, a prompt, a message, etc.

Further, at 206, the method 200 may include identifying, using the processing device, at least one information based on the at least one request. Further, the identifying of the at least one information may include searching a knowledge base using the at least one request. Further, the at least one information may include at least a portion of the knowledge base. Further, the at least one request may be used as a search query for the searching of the knowledge base. Further, the at least one information may include at least a passage from the knowledge base. Further, the at least one information may be associated with a context of the at least one request.

Further, at 208, the method 200 may include generating, using the processing device, at least one input for at least one machine learning model based on the at least one request and the at least one information. Further, the at least one input may include the at least one request and the at least one information. Further, the generating of the at least one input may include combining the at least one request with the at least one information.

Further, at 210, the method 200 may include processing, using the processing device, the at least one input using the at least one machine learning model. Further, the at least one machine learning model may be configured for generating at least one output based on the at least one input.

Further, at 212, the method 200 may include generating, using the processing device, at least one response for the at least one request based on the processing of the at least one input. Further, the at least one response may include an answer, an output, etc.

Further, at 214, the method 200 may include transmitting, using the communication device, the at least one response through the conversational interaction interface for conversationally interacting with the at least one user to the at least one user device. Further, the conversationally interacting with the at least one user helps the at least one user to achieve a goal, accomplish a target, develop a personality, receive a guidance, etc.

Further, at 216, the method 200 may include storing, using a storage device, the at least one machine learning model, the at least one request, and the at least one response.

In further embodiments, the method 200 may include analyzing, using the processing device, the at least one request using the at least one machine learning model. Further, the at least one machine learning model may be configured for generating at least one initial output based on the at least one request. Further, the identifying of the at least one information may be further based on the at least one initial output. Further, the generating of the at least one output may be further based on the at least one initial output. Further, the at least one initial output may include an initial response generated by the at least one machine learning model based on the at least one request. Further, the at least one initial output may be used as the search query.

Further in some embodiments, the at least one machine learning model may include at least one large language model (LLM) comprising a generative pre-trained transformer (GPT) architecture.

Further in some embodiments, the at least one machine learning model may be associated with at least one persona. Further, the at least one machine learning model may be configured for modifying the at least one output based on the at least one persona. Further, the generating of the at least one response may be further based on the modifying of the at least one output based on the at least one persona. Further, the at least one persona may include at least one personality characteristic. Further, the at least one personality characteristic may include a name, a speaking pattern, a filler word, etc. Further, the at least one persona embodies a real entity, a virtual entity, etc.

Figure 3:
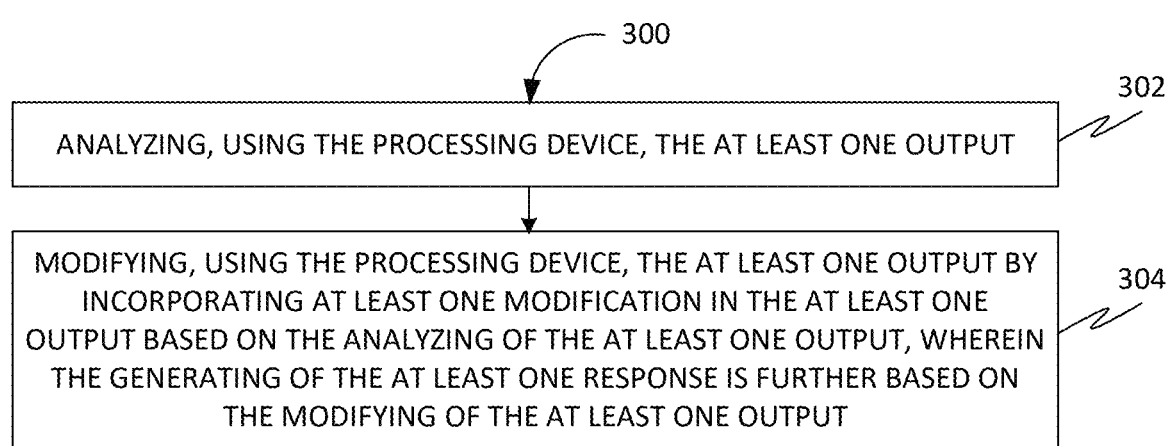
FIG. 3 is a flowchart of a method 300 for facilitating conversational interaction with users to help the users, in accordance with some embodiments.

FIG. 3 is a flowchart of a method 300 for facilitating conversational interaction with users to help the users, in accordance with some embodiments. Accordingly, at 302, the method 300 may include analyzing, using the processing device, the at least one output.

Further, at 304, the method 300 may include modifying, using the processing device, the at least one output by incorporating at least one modification in the at least one output based on the analyzing of the at least one output. Further, the generating of the at least one response may be further based on the modifying of the at least one output. Further, the at least one modification removes words having a negative connotation in the at least one response, summarizes the at least one response within 100 words, provides bulletized summary of the at least one response, adds a disclaimer to the at least one response, etc.

FIG. 4 is a flowchart of a method 400 for facilitating conversational interaction with users to help the users, in accordance with some embodiments. Accordingly, at 402, the method 400 may include analyzing, using the processing device, the at least one request. Further, the analyzing of the at least one request may include performing prompt engineering on the at least one request. Further, the prompt engineering may be associated with a prompt engineering process.

Further, at 404, the method 400 may include identifying, using the processing device, at least one instruction for the at least one request based on the analyzing of the at least one request. Further, the at least one instruction may be for the at least one machine learning model.

Further, at 406, the method 400 may include appending, using the processing device, the at least one instruction to the at least one request. Further, the generating of the at least one input may be based on the appending of the at least one instruction. Further, the at least one input may include at least one context associated with the at least one user and at least one prompt for the at least one machine learning model.

FIG. 5 is a flowchart of a method 500 for facilitating conversational interaction with users to help the users, in accordance with some embodiments. Further, the at least one machine learning model may be trained using a plurality of training samples. Further, at 502, the method 500 may include retrieving, using the storage device, at least one data specific to at least one domain. Further, the at least one domain may be associated with EB1A application. Further, the plurality of training samples may include a diverse set of annotated examples of queries and responses to queries.

Further, at 504, the method 500 may include analyzing, using the processing device, the at least one data. Further, the at least one data may include EB-1A resources, such as policy documents, legal cases, and success stories.

Further, at 506, the method 500 may include generating, using the processing device, at least one additional training sample for the at least one machine learning model.

Further, at 508, the method 500 may include tuning, using the processing device, the at least one machine learning model based the at least one additional training sample using at least one training technique. Further, the at least one machine learning model may be configured for performing at least one operation for the generating of the at least one output based on the tuning. Further, the tuning of the at least one machine learning model may include fine tuning the at least one machine learning model. Further, the at least one training technique may include an advanced natural language understanding technique, a regularization technique, a coherence modeling technique, a few shot learning technique, etc.

FIG. 6 is a flowchart of a method 600 for facilitating conversational interaction with users to help the users, in accordance with some embodiments. Accordingly, at 602, the method 600 may include analyzing, using the processing device, at least one interaction with the at least one user through the conversational interaction interface. Further, the at least one interaction may include the at least one request and the at least one response.

Further, at 604, the method 600 may include determining, using the processing device, at least one task for the at least one user based on the analyzing of the at least one interaction. Further, the at least one task may include taking an assessment, writing an article, performing an action, etc.

Further, at 606, the method 600 may include transmitting, using the communication device, the at least one task to the at least one user device through the conversational interaction interface.

In further embodiments, the method 600 may include determining, using the processing device, at least one task information associated with the at least one task based on the determining of the at least one task. Further, the determining of the at least one task information may be initiated based on at least one predefined condition. Further, at least one contextual variable based on the at least one predefined condition further represents a condition relevant to the determining of the at least one task information. Further, the at least one contextual variable may include a physical state of the at least one device. Further, the at least one device comprises at least one sensor for generating the physical state of the at least one user device. Further, the method 600 may include analyzing, using the processing device, the at least one task information. Further, the method 600 may include generating, using the processing device, at least one additional response for the at least one user based on the analyzing of the at least one task information. Further, the method 600 may include transmitting, using the communication device, the at least one task information through the conversational interaction interface to the at least one user device.

Figure 7:
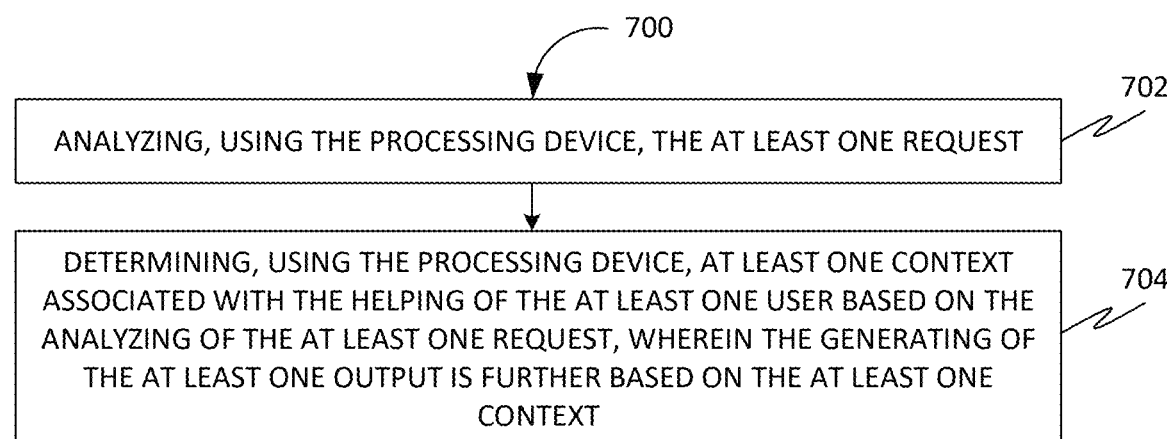
FIG. 7 is a flowchart of a method 700 for facilitating conversational interaction with users to help the users, in accordance with some embodiments.

FIG. 7 is a flowchart of a method 700 for facilitating conversational interaction with users to help the users, in accordance with some embodiments. Accordingly, at 702, the method 700 may include analyzing, using the processing device, the at least one request.

Further, at 704, the method 700 may include determining, using the processing device, at least one context associated with the helping of the at least one user based on the analyzing of the at least one request. Further, the generating of the at least one output may be based on the at least one context. Further, the at least one context may include an intent of the at least one user, a level of specificity required in the at least one response, etc. Further, the at least one machine learning model dynamically adjusts at least one model parameter responsible for curating the at least one output based on the at least one context. Further, the at least one model parameter may include a weight, a top-k sampling, a temperature, a beam size, a length of output, a top-p sampling, etc.

FIG. 8 is a flowchart of a method 800 for facilitating conversational interaction with users to help the users, in accordance with some embodiments. Accordingly, at 802, the method 800 may include retrieving, using the storage device, a plurality of historical requests and a plurality of responses associated with the plurality of requests.

Further, at 804, the method 800 may include analyzing, using the processing device, the plurality of historical requests and the plurality of responses.

Further, at 806, the method 800 may include clustering, using the processing device, the plurality of historical requests and the plurality of responses in at least one cluster using at least one criterion based on the analyzing of the plurality of historical requests and the plurality of responses. Further, the at least one cluster corresponds to at least one group of the plurality of historical requests and the plurality of responses. Further, the clustering may be performed using a k-means clustering.

Further, at 808, the method 800 may include storing, using the storage device, the at least one cluster.

Further, at 810, the method 800 may include analyzing, using the processing device, the at least one request and the at least one cluster.

Further, at 812, the method 800 may include identifying, using the processing device, at least one of the at least one cluster based on the analyzing of the at least one request and the clustering. Further, the generating of the at least one response may be based on at least one of the at least one cluster for the at least one request.

Figure 9:
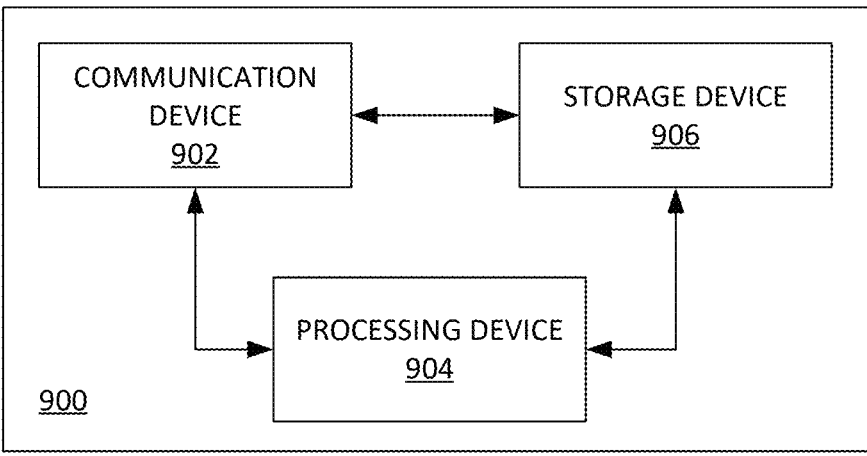
FIG. 9 is a block diagram of a system 900 for facilitating conversational interaction with users to help the users, in accordance with some embodiments.

FIG. 9 is a block diagram of a system 900 for facilitating conversational interaction with users to help the users, in accordance with some embodiments. Accordingly, the system 900 may include a communication device 902, a processing device 904, and a storage device 906.

Figure 10:
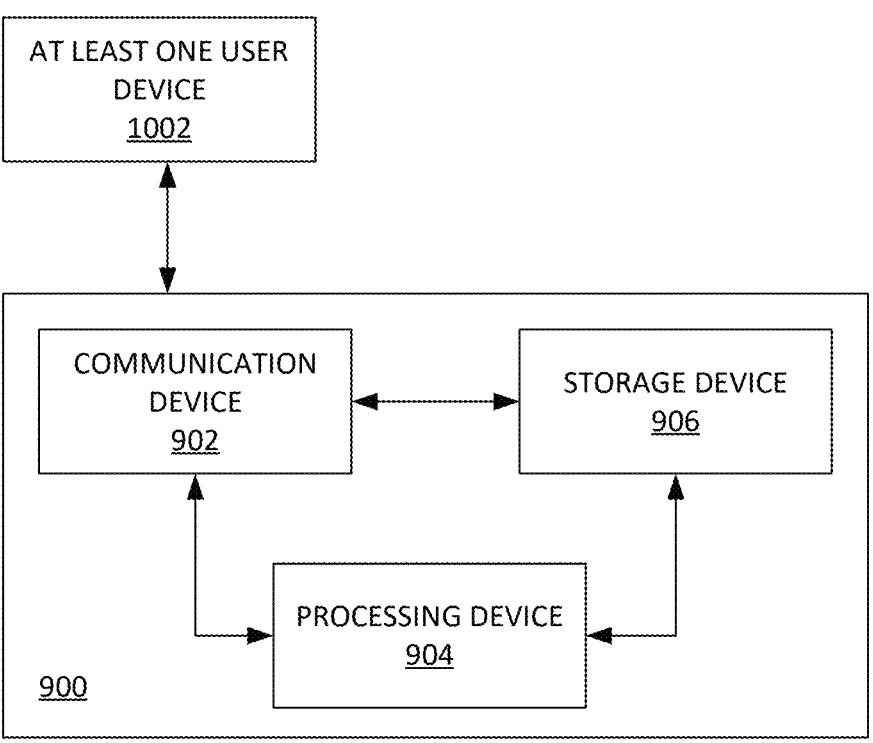
FIG. 10 is a block diagram of the system 900, in accordance with some embodiments.

Further, the communication device 902 may be configured for transmitting a conversational interaction interface for conversationally interacting with at least one user to at least one user device 1002, as shown in FIG. 10, associated with the at least one user. Further, the communication device 902 may be configured for receiving at least one request of the at least one user through the conversational interaction interface from the at least one user device. Further, the communication device 902 may be configured for transmitting the at least one response through the conversational interaction interface for conversationally interacting with the at least one user to the at least one user device 1002.

Further, the processing device 904 may be communicatively coupled with the communication device 902. Further, the processing device 904 may be configured for identifying at least one information based on the at least one request. Further, the processing device 904 may be configured for generating at least one input for at least one machine learning model based on the at least one request and the at least one information. Further, the at least one input may include the at least one request and the at least one information. Further, the processing device 904 may be configured for processing the at least one input using the at least one machine learning model. Further, the at least one machine learning model may be configured for generating at least one output based on the at least one input. Further, the processing device 904 may be configured for generating the at least one response for the at least one request based on the processing of the at least one input.

Further, the storage device 906 may be communicatively coupled with the processing device 904. Further, the storage device 906 may be configured for storing the at least one machine learning model, the at least one request, and the at least one response.

Further, in some embodiments, the processing device 904 may be configured for analyzing the at least one output.

Further, the processing device 904 may be configured for modifying the at least one output by incorporating at least one modification in the at least one output based on the analyzing of the at least one output. Further, the generating of the at least one response may be based on the modifying of the at least one output.

Further, in some embodiments, the processing device 904 may be configured for analyzing the at least one request. Further, the processing device 904 may be configured for identifying at least one instruction for the at least one request based on the analyzing of the at least one request. Further, the processing device 904 may be configured for appending the at least one instruction to the at least one request. Further, the generating of the at least one input may be based on the appending of the at least one instruction.

Further, in some embodiments, the processing device 904 may be configured for analyzing the at least one request using the at least one machine learning model. Further, the at least one machine learning model may be configured for generating at least one initial output based on the at least one request. Further, the identifying of the at least one information may be based on the at least one initial output. Further, the generating of the at least one output may be based on the at least one initial output.

Further, in some embodiments, the at least one machine learning model may include at least one large language model (LLM) comprising a generative pre-trained transformer (GPT) architecture.

Further, in some embodiments, the at least one machine learning model may be trained using a plurality of training samples. Further, the storage device 906 may be configured for retrieving at least one data specific to at least one domain. Further, the processing device 904 may be configured for analyzing the at least one data. Further, the processing device 904 may be configured for generating at least one additional training sample for the at least one machine learning model. Further, the processing device 904 may be configured for tuning the at least one machine learning model based the at least one additional training sample using at least one training technique. Further, the at least one machine learning model may be configured for performing at least one operation for the generating of the at least one output based on the tuning.

Further, in some embodiments, the at least one machine learning model may be associated with at least one persona. Further, the at least one machine learning model may be configured for modifying the at least one output based on the at least one persona. Further, the generating of the at least one response may be based on the modifying of the at least one output based on the at least one persona.

Further, in some embodiments, the processing device 904 may be configured for analyzing at least one interaction with the at least one user through the conversational interaction interface. Further, the at least one interaction may include the at least one request and the at least one response. Further, the processing device 904 may be configured for determining at least one task for the at least one user based on the analyzing of the at least one interaction. Further, the communication device 902 may be configured for transmitting the at least one task to the at least one user device 1002 through the conversational interaction interface.

Further, in some embodiments, the processing device 904 may be configured for analyzing the at least one request. Further, the processing device 904 may be configured for determining at least one context associated with the helping of the at least one user based on the analyzing of the at least one request. Further, the generating of the at least one output may be based on the at least one context.

Further, in some embodiments, the storage device 906 may be configured for retrieving a plurality of historical requests and a plurality of responses associated with the plurality of requests. Further, the storage device 906 may be configured for storing at least one cluster. Further, the processing device 904 may be configured for analyzing the plurality of historical requests and the plurality of responses. Further, the processing device 904 may be configured for clustering the plurality of historical requests and the plurality of responses in the at least one cluster using at least one criterion based on the analyzing of the plurality of historical requests and the plurality of responses. Further, the processing device 904 may be configured for analyzing the at least one request and the at least one cluster. Further, the processing device 904 may be configured for identifying at least one of the at least one cluster based on the analyzing of the at least one request and the clustering. Further, the generating of the at least one response may be based on at least one of the at least one cluster for the at least one request.

FIG. 10 is a block diagram of the system 900, in accordance with some embodiments.

FIG. 11 is a graphical representation 1100 of human action dimensions identified by the common questions framework, in accordance with some embodiments. Further, the graphical representation 1100 shows the functionality between LLM and the prompt layer. It shows the end-to-end interaction that allows responses to questions posed to be generated. The architecture diagram shows how the mobile application and backend server seamlessly integrate with the Language Model (LLM) and Prompt Layer. Data flow and communication between the many components ensure a seamless, flexible, and adaptable user experience that makes the app an invaluable resource for users residing in the United States of America and trying to achieve the EB1A visa by proving their extraordinary skills.

FIG. 12 is a block diagram of an architecture 1200 of an application for facilitating conversational interaction with users to help the users, in accordance with some embodiments. Further, the architecture 1200 may include a user device (mobile) 1202 associated with a user 1204. Further, the user 1204 may interact with the application through the user device 1202. Further, the architecture 1200 may include a backend 1206. Further, the backend 1206 may include a server 1208, a large language model (LLM) 1210, a prompt layer 1212, and a database 1214. Further, the user device 1202 sends a request to the server 1208 and receives a response from the server 1208. Further, the server 1208 sends a request to the LLM model 1210 and receives a response from the LLM model 1210. Further, the LLM model 1210 may send a prompt to the prompt layer 1212 and receives an altered prompt from the prompt layer 1212. Further, the LLM model 1210 sends a request to the database 1214 and receives a response from the database 1214.

Figure 13:
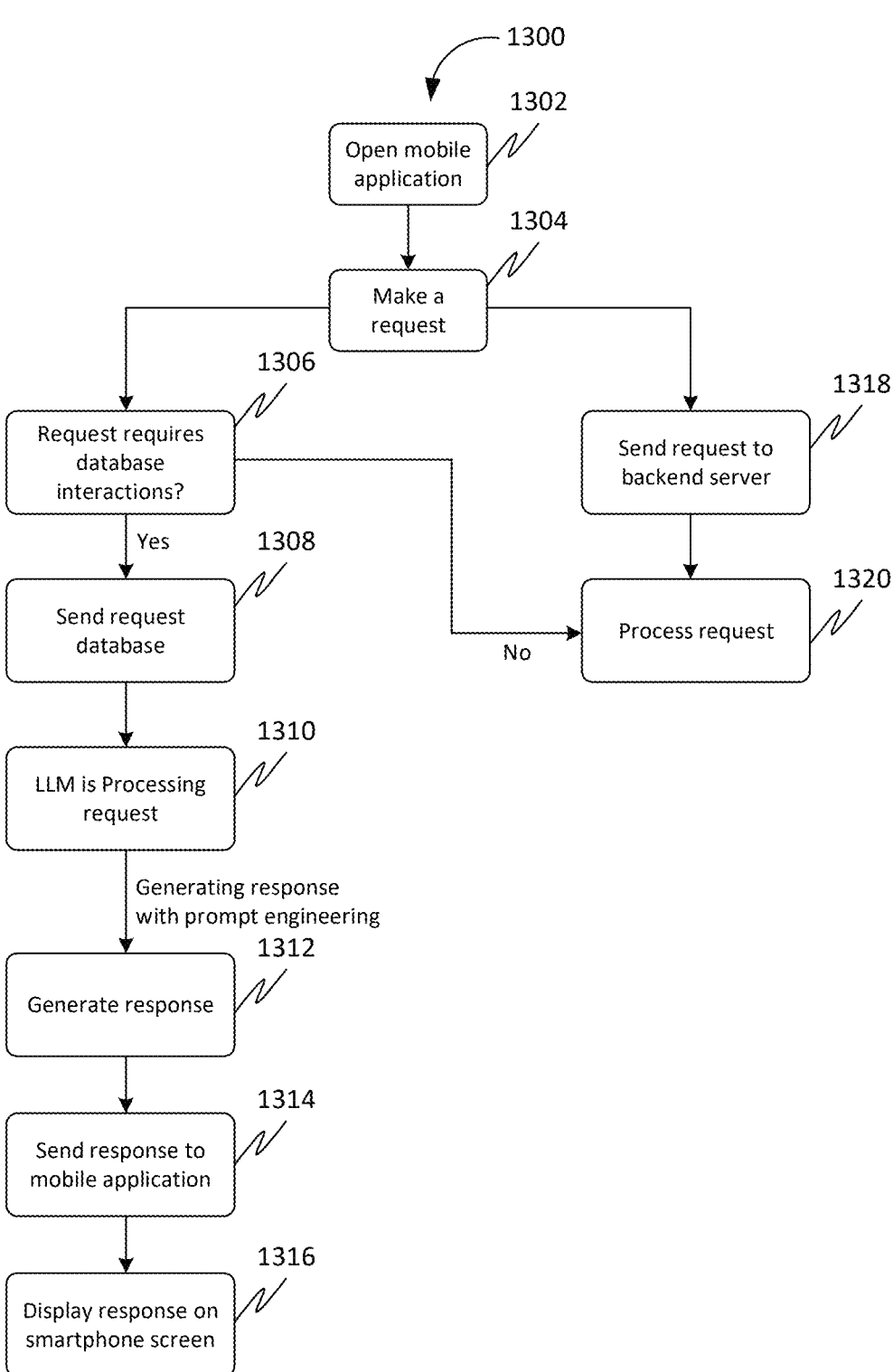
FIG. 13 is a flowchart of a method 1300 describing end-to-end interaction and journey encountered by a user using the application, in accordance with some embodiments.

FIG. 13 is a flowchart of a method 1300 describing end-to-end interaction and journey encountered by a user using the application, in accordance with some embodiments. Further, the method 1300 may include a step 1302 of opening a mobile application. Further, the method 1300 may include a step 1304 of making a request. Further, the method 1300 may include a step 1306 of determining whether the request requires database interaction after the step 1304. Further, the method 1300 may include a step 1308 of sending the request to a database after the step 1306 if the request requires the database interactions. Further, the method 1300 may include a step of 1310 of processing the request by LLM after the step 1308. Further, the method 1300 may include a step 1312 of generating a response after the step 1310. Further, the response is generated with prompt engineering. Further, the method 1300 may include a step 1314 of sending the response to the mobile application after the step 1312. Further, the method 1300 may include a step 1316 of displaying the response on a smartphone screen after the step 1314. Further, the method 1300 may include a step 1318 sending the request to a backend server after the step 1304. Further, the method 1300 may include a step 1320 of processing the request after the step 1318. Further, the method 1300 moves to the step 1320 after the step 1306 if the request do not require the database interactions.

FIG. 14 illustrates a database structure 1400 for selecting unique identifications for facilitating conversational interaction with users to help the users, in accordance with some embodiments.

Figure 15:
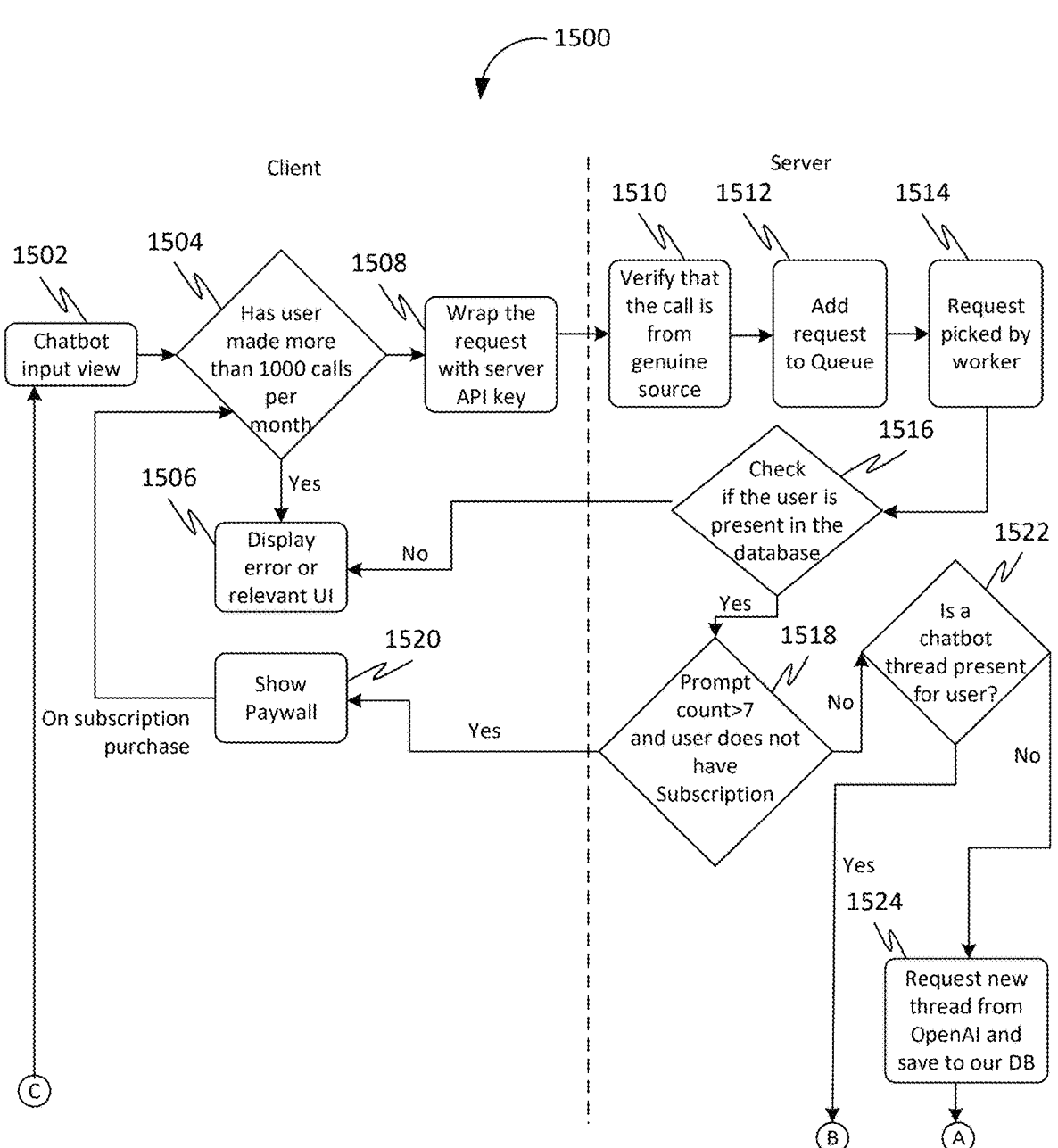
FIG. 15 is a flow diagram of a method 1500 describing a prompt flow and a working of the prompt flow in a backend with client server communication, in accordance with some embodiments.

FIG. 15 is a flow diagram of a method 1500 describing a prompt flow and a working of the prompt flow in a backend with client server communication, in accordance with some embodiments. Further, the method 1500 may include a step 1502 with a chatbot input view. Further, the method 1500 may include a step 1504 after the step 1502 for determining has the user made more than 1000 calls per month. If yes, the method 1500 may include a step 1506 of displaying error or relevant user interface (UI). If no, the method 1500 may include a step 1508 of wrapping the request with a server API key. Further, the method 1500 may include a step 1510 of verifying that the call is from a genuine source after the step 1508. Further, the method 1500 may include a step 1512 of adding the request to a queue after the step 1510. Further, the method 1500 may include a step 1514 picking of the request by a worker after the step 1512. Further, the method 1500 may include a step 1516 of checking if the user is present in the database. If yes, the method 1500 include a step 1518 of determining whether the prompt count is greater than 7 and whether the user does not have the subscription. If no, the method 1500 moves to the step 1506 after the step 1516. After the step 1518, if the prompt count is greater than 7 and the user does not have the subscription, the method 1500 may include a step 1520 of showing a pay wall. Further, the method 1500 moves to the step 1504 after the step 1520 based on a purchase of the subscription. After the step 1518, if the prompt count is not greater than 7 and the user does have the subscription, the method 1500 may include a step 1522 of checking is a chatbot thread present for the user. If no, the method 1500 moves to a step 1524 of requesting a new thread from OpenAI and saving to a database. If yes, the method 1500 moves to a step 1526 of performing prompt engineering to append "Please don't use no, not, never, don't, or any other negative persona in your response. Please concise your response within 100 words, and at the end, say Hence to summarize; and give 3.5 bullet points summarizing the same. If you don't know the answer please reply 'I apologize, but this question is outside of my expertise as an executive coach. I am only able answer questions related to EB1A". Further, the method 1500 moves to the step 1526 after the step 1524. Further, the method 1500 may include a step 1528 of adding updated message to the thread. Further, the method 1500 may include a step 1530 of requesting to run the thread and waiting until the thread has no more steps after the step 1528. If there is success, the method 1500 may include a step 1532 of reading a latest message from thread and sending it back. If there is failure, the method 1500 may include a step 1534 of determining whether the exponential backoff tries is less than 2. Further, the method 1500 may include a step 1536 of performing exponential backoff after the step 1534. Further, the method 1500 moves to the step 1530 after the step 1536. Further, the method 1500 may include a step 1538 of displaying error to retry. Further, the method 1500 moves to the step 1502 after the step 1532.

Figure 16:
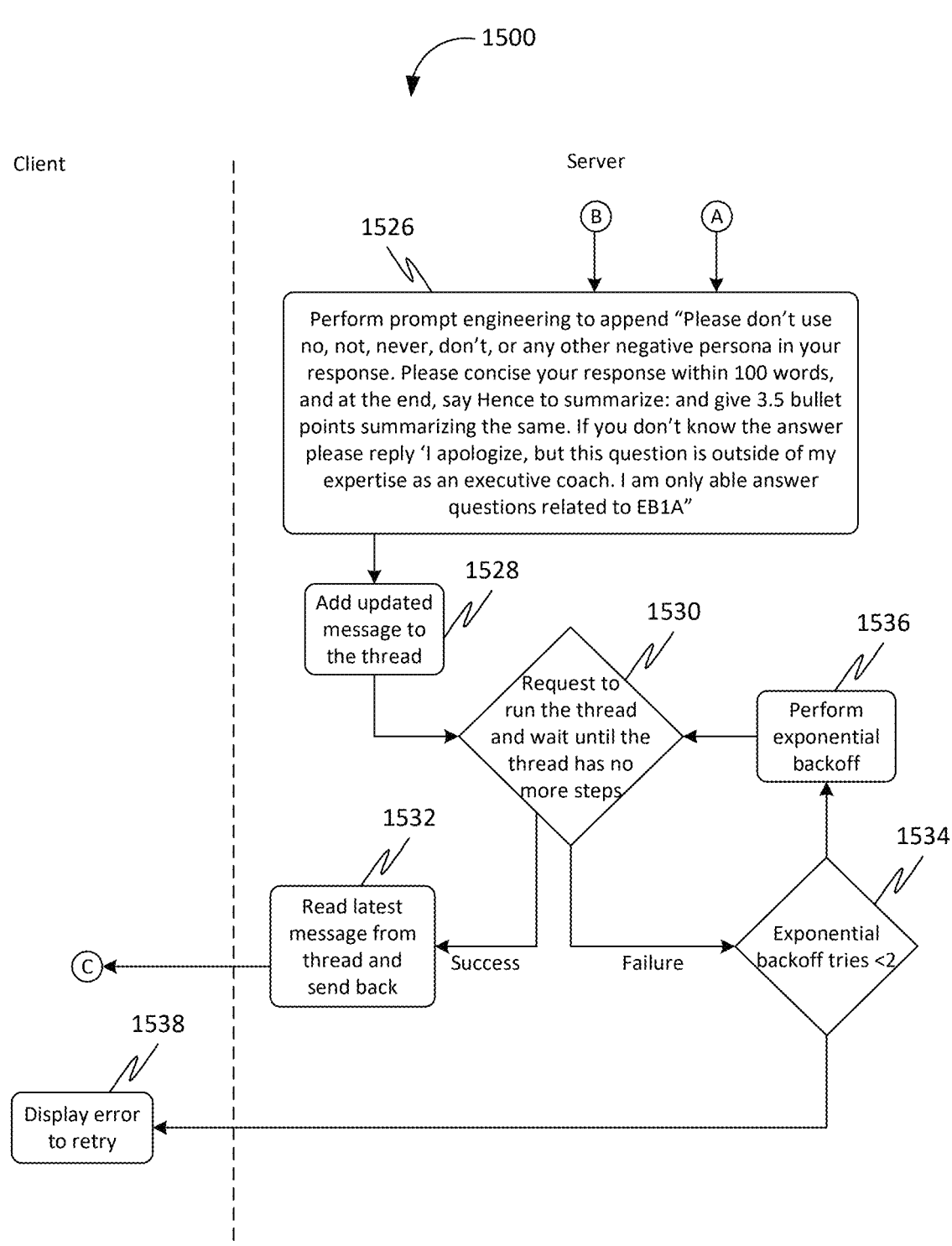
FIG. 16 is a continuation flow diagram of the method 1500, in accordance with some embodiments.

FIG. 16 is a continuation flow diagram of the method 1500, in accordance with some embodiments.

Figure 17:
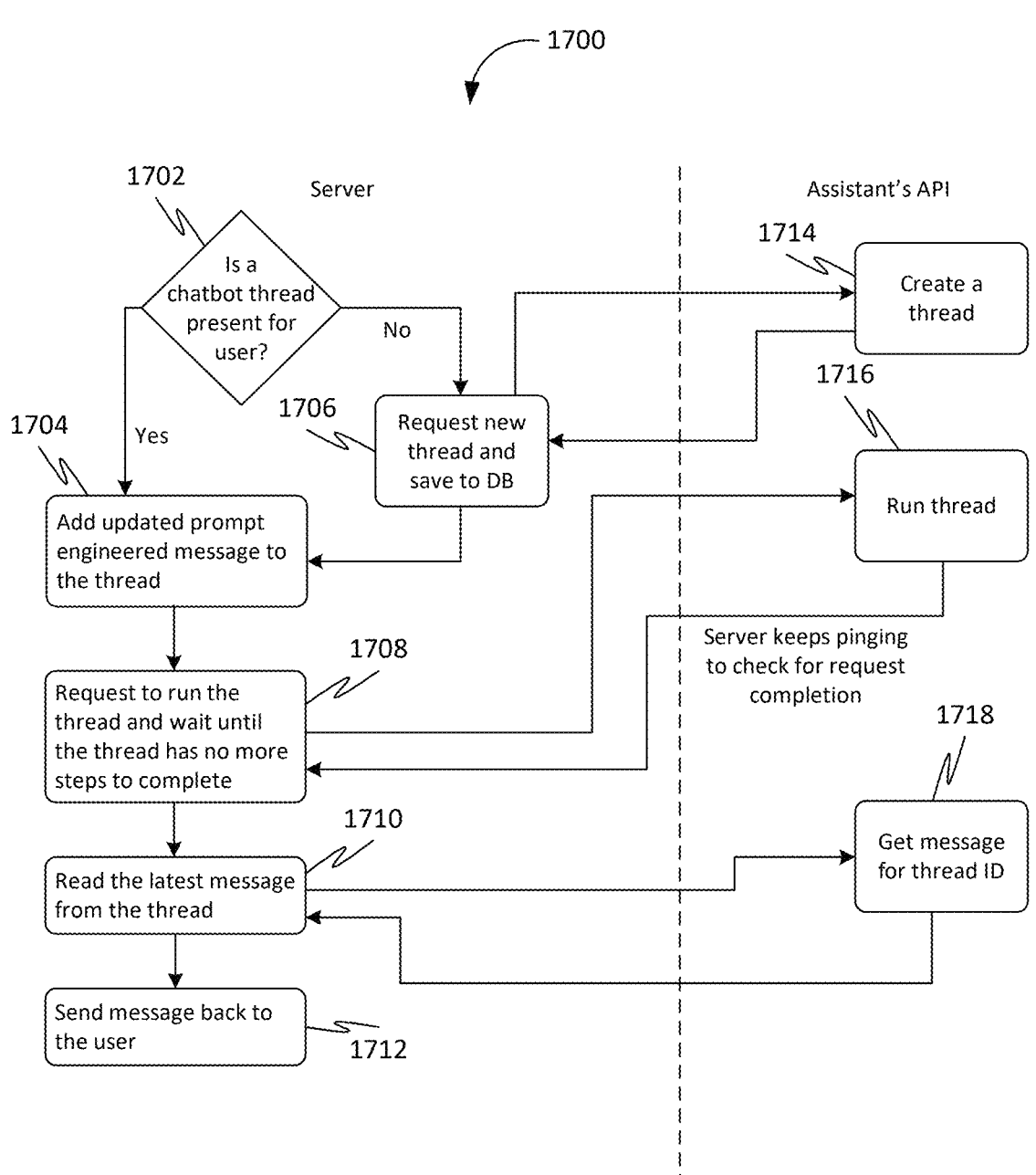
FIG. 17 is a flow diagram of a method 1700 describing server and OpenAI interaction, in accordance with some embodiments.

FIG. 17 is a flow diagram of a method 1700 describing server and OpenAI interaction, in accordance with some embodiments. Further, the method 1700 may include a step 1702 of determining is a chatbot thread present for user. If yes, the method 1700 may include step 1704 of adding an updating prompt engineered message to the thread. If no, the method 1700 may include a step 1706 of requesting a new thread and save to the database. Further, the method 1700 moves to the step 1704 after the step 1706. Further, the method 1700 may include a step 1708 of requesting to run the thread and wait until the thread has no more steps to complete. Further, the method 1700 may include a step 1710 of reading the latest message from the thread. Further, the method 1700 may include a step 1712 of sending message back to the user. Further, the method 1700 may include a step 1714 of creating a thread. Further, the method 1700 moves to the step 1706 after the step 1714. Further, the method 1700 may include a step 1716 of running the thread after the step 1708. Further, the method 1700 moves to the step 1708 after the step 1716. Further, the server keeps pinging to check for request completion. Further, the method 1700 may include a step of 1718 getting a message for thread ID after the step 1710. Further, the method 1700 moves to the step 1710 after the step 1718.

FIG. 18 is a flow diagram of a method 1800 associated with retrieval-augmented generation (RAG), in accordance with some embodiments. Further, the method 1800 may include a step 1802 of obtaining a user query. Further, the user query may include a question or a task given to a LLM. Further, the method 1800 may include a step 1804 of retrieving a knowledge. Further, the RAG searches a knowledge base (Like a database, next league program data and transcript provided) and extracts relevant information based on the user's query. Further, the method 1800 may include a step 1806 of augmenting input. The retrieved information is combined with the original user queries to create a new, information-rich input for the LLM. Further, the method 1800 may include a step 1808 of generating response. The retrieved information is combined with the original user queries to create a new, information-rich input for the LLM.

FIG. 19 is a flow diagram of a method 1900 for adding next league program's data to a generative pretrained transformer (GPT), in accordance with some embodiments. Further, the method 1900 may include a step 1902 of obtaining the next league program's video. Further, the method 1900 may include a step 1904 of obtaining text files for the next league program's video by performing transcription using video to text model. Further, the method 1900 may include a step 1906 of uploading the text files to the GPT. Further, the uploading may be based on a UI based functionality in a GPT application associated with the GPT. Further, the method 1908 may include a step 1908 of consuming a grounded model.

Figure 20:
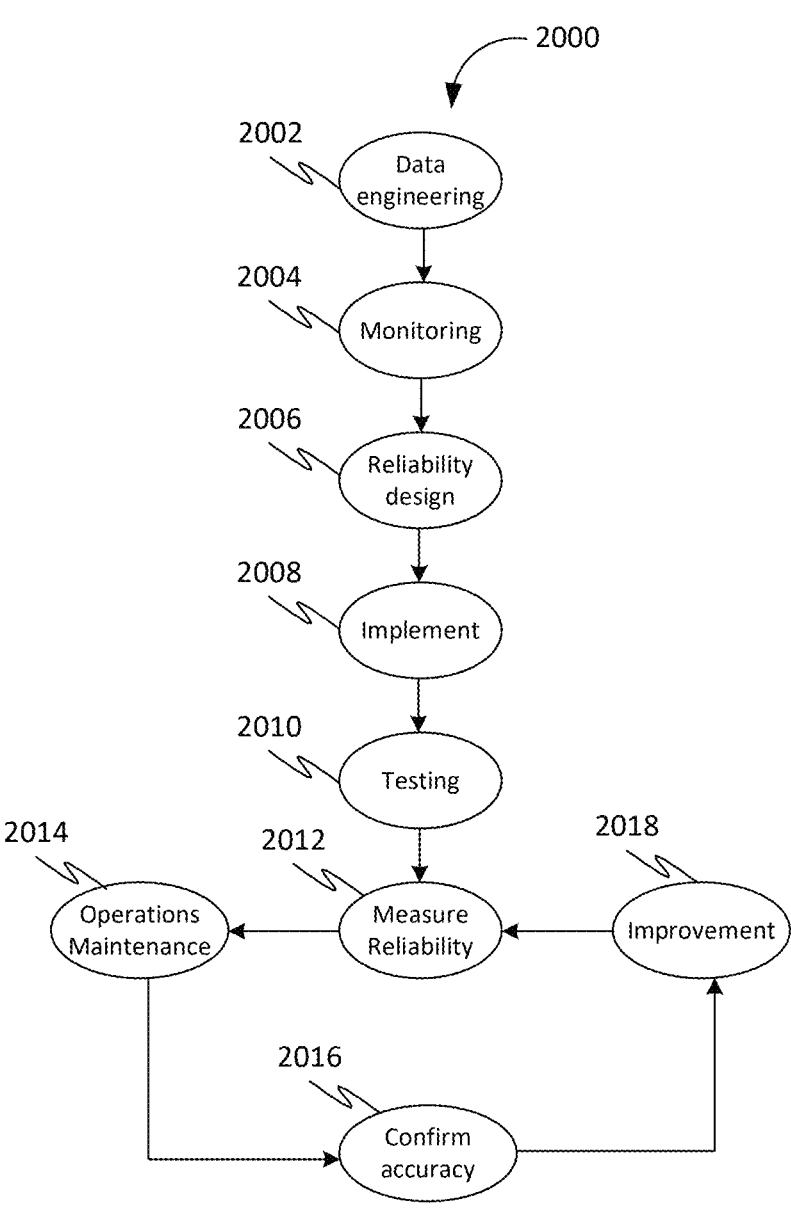
FIG. 20 is a flow diagram of a method 2000 for facilitating integration of a generative pretrained transformer application with a mobile interface and a user experience design, in accordance with some embodiments.

FIG. 20 is a flow diagram of a method 2000 for facilitating integration of a generative pretrained transformer application with a mobile interface and a user experience design, in accordance with some embodiments. Further, the method 2000 may include a step 2002 of data engineering. Further, the method 2000 may include a step 2004 of monitoring after the step 2002. Further, the method 2000 may include a step 2006 of reliability designing after the step 2004. Further, the method 2000 may include a step 2008 of implementing after the step 2006. Further, the method 2000 may include a step 2010 of testing after the step 2008. Further, the method 2000 may include a step 2012 of measuring reliability after the step 2010. Further, the method 2000 may include a step 2014 of operation maintenance after the step 2012. Further, the method 2000 may include a step 2016 of confirming accuracy after the step 2014. Further, the method 2000 may include a step 2018 of improvement after the step 2016. Further, the method 2000 moves to the step 2012.

FIG. 21 is a block diagram of a real time retrieval augmented generation system 2100, in accordance with some embodiments. Further, the real time retrieval augmented generation system 2100 may include a real time data engineering component 2102, an inference component 2104, and a LLM training/fine tuning component 2106. Further, the real time data engineering component 2102 may include an API/web source 2108 connected to a streaming service 2110. Further, the inference component 2104 may include a UI/front end 2112 and a restful API 2114. Further, the LLM training/fine tuning component 2106 may include a LLM model 2116, a Q/A generation component 2118 connected to the LLM model 2116, a Q/A dataset 2120 for fine tuning connected to the Q/A generation component 2118, a model fine tunning component (QLoRa) 2122 connected to the Q/A dataset 2120, and an experiment tracking component 2124 connected to the model fine tunning component 2122.

Further, the streaming service 2110 may be connected to an embedding model 2126. Further, the embedding model 2128 may be connected to the Q/A generation component. Further, the restful API 2114 may be connected with the model fine-tuning component 2122 using a model registry 2130.

The architecture of the real time retrieval augmented generation system 2100 illustrates a pipeline where real-time data is ingested, processed, and converted into embeddings, which are then used for various purposes, including generating question-answer pairs for fine-tuning a large language model. The fine-tuned model can then be served through the inference component for applications like conversational AI or question-answering systems.

Figure 22:
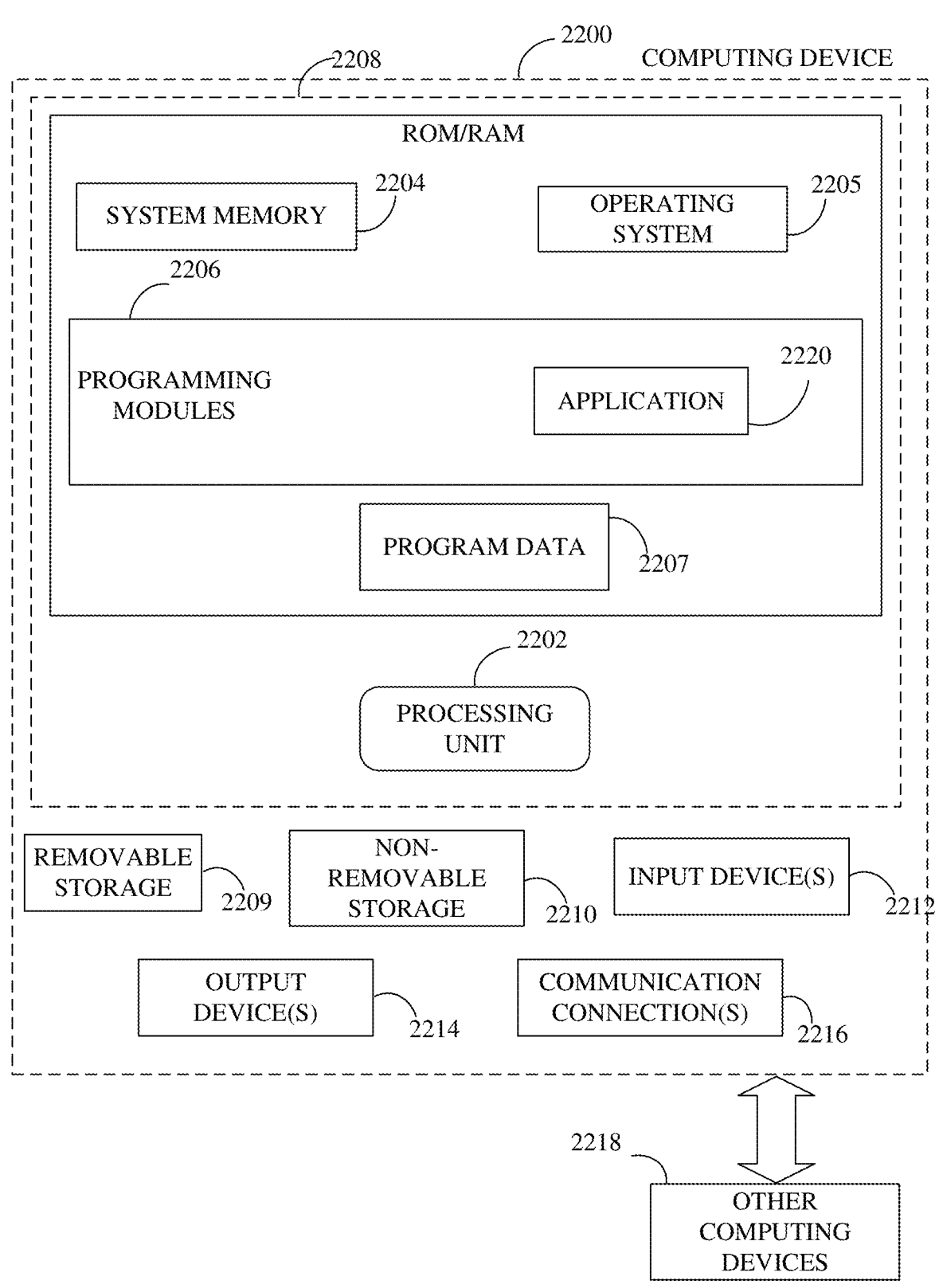
FIG. 22 is a block diagram of a computing device for implementing the methods disclosed herein, in accordance with some embodiments.

With reference to FIG. 22, a system consistent with an embodiment of the disclosure may include a computing device or cloud service, such as computing device 2200. In a basic configuration, computing device 2200 may include at least one processing unit 2202 and a system memory 2204. Depending on the configuration and type of computing device, system memory 2204 may comprise, but is not limited to, volatile (e.g. random-access memory (RAM)), non-volatile (e.g. read-only memory (ROM)), flash memory, or any combination. System memory 2204 may include operating system 2205, one or more programming modules 2206, and may include a program data 2207. Operating system 2205, for example, may be suitable for controlling computing device 2200's operation. In one embodiment, programming modules 2206 may include image-processing modules, machine learning modules, etc. Furthermore, embodiments of the disclosure may be practiced in conjunction with a graphics library, other operating systems, or any other application program and is not limited to any particular application or system. This basic configuration is illustrated in FIG. 22 by those components within a dashed line 2208.

Computing device 2200 may have additional features or functionality. For example, computing device 2200 may also include additional data storage devices (removable and/or non-removable) such as, for example, magnetic disks, optical disks, or tape. Such additional storage is illustrated in FIG. 22 by a removable storage 2209 and a non-removable storage 2210. Computer storage media may include volatile and non-volatile, removable, and non-removable media implemented in any method or technology for storage of information, such as computer-readable instructions, data structures, program modules, or other data. System memory 2204, removable storage 2209, and non-removable storage 2210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD), other optical storage, magnetic cassettes, magnetic tape, magnetic disk storage or other magnetic storage devices, or any other medium which can be used to store information and which can be accessed by computing device 2200. Any such computer storage media may be part of device 2200. Computing device 2200 may also have input device(s) 2212 such as a keyboard, a mouse, a pen, a sound input device, a touch input device, a location sensor, a camera, a biometric sensor, etc. Output device(s) 2214 such as a display, speakers, a printer, etc. may also be included. The aforementioned devices are examples and others may be used.

Computing device 2200 may also contain a communication connection 2216 that may allow device 2200 to communicate with other computing devices 2218, such as over a network in a distributed computing environment, for example, an intranet or the Internet. Communication connection 2216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 2204, including operating system 2205. While executing on processing unit 2202, programming modules 2206 (e.g., application 2220 such as a media player) may perform processes including, for example, one or more stages of methods, algorithms, systems, applications, servers, databases as described above. The aforementioned process is an example, and processing unit 2202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like.

Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

REFERENCES

1. Cordeiro, Jose & Filipe, Joaquim & Liu, Kecheng. (2009). Towards a Human Oriented Approach to Information Systems Development.
2. Akers, Adam, et al. "Visual color perception in green exercise: Positive effects on mood and perceived exertion." *Environmental science & technology* 46.16 (2012): 8661-8666.
3. Apple Developer—Swift. Swift programming language overview. Available at https://developer.apple.com/swift/.
4. Apple Developer—SwiftUI. SwiftUI tutorials and documentation. Available at https://developer.apple.com/tutorials/swiftui.
5. Point-Free Inc—The Composable Architecture. GitHub repository for The Composable Architecture (TCA). Available at https://github.com/pointfreeco/swift-composable-architecture.
6. Apple Developer—Keychain Services API. Documentation for Keychain Services API. Available at https://developer.apple.com/documentation/security/keychain_services/.
7. OpenAI—Handling Rate Limits. Example of handling rate limits in OpenAI API. Available at https://github.com/openai/openai-cookbook/blob/main/examples/How_to_handle_rate_limits.ipynb.
8. W3Schools—MySQL. MySQL Database tutorial. Available at https://www.w3schools.com/MySQL/default.asp.
9. OpenAI Assistants API. Documentation and user guide for using Assistants API. Available at https://platform.openai.com/docs/assistants.
10. Hostinger—Web Hosting. Information about server hosting and configurations. Available at https://www.hostinger.com/web-hosting.
11. Ubuntu. Details about the Ubuntu 23.04 operating system. Available at https://ubuntu.com/.
12. Cloudflare—HTTPS and Security. Why HTTPS is secure compared to HTTP. Available at https://www.cloudflare.com/learning/ssl/why-is-http-not-secure/.
13. Nginx—Configuring HTTPS servers. Guide on how to redirect HTTP traffic to HTTPS in Nginx. Available at https://nginx.org/en/docs/http/configuring_https_servers.html.
14. Memfault. (n.d.). Client-side rate limits in Android. Retrieved from https://docs.memfault.com/docs/android/android-rate-limiting/15.

15. Simplilearn. (n.d.). What is Node.js?. Simplilearn. Retrieved from https://www.simplilearn.com/tutorials/nodejs-tutorial/what-is-nodejs 16. Fortinet. (n.d.). What is an API Key?. Fortinet. Retrieved from https://www.fortinet.com/resources/cyberglossary/api-key 17. https://www.whitehouse.gov/briefing-room/presidential-actions/2023/10/30/executive-order-on-the-safe-secure-and-trustworthy-development-and-use-of-artificial-intelligence/#:~:text=The%20Federal%20Government%20will%20seek, inequities%2C%20threatening%20human%20rights%2C%20and

What is claimed is:

1. A method for facilitating conversational interaction with users to help the users, the method comprising:

transmitting, using a communication device, a conversational interaction interface for conversationally interacting with at least one user to at least one user device associated with the at least one user;

receiving, using the communication device, at least one request of the at least one user through the conversational interaction interface from the at least one user device;

analyzing, using a processing device, the at least one request using at least one machine learning model, wherein the at least one machine learning model is configured for generating at least one initial output based on the at least one request, wherein the at least one machine learning model is configured for querying a knowledge base using the at least one initial output as a search query:

identifying, using the processing device, at least one information based on the at least one request, wherein the identifying of the at least one information is further based on the querying of the knowledge base using the at least one initial output, wherein the at least one information comprises at least a portion of the knowledge base;

generating, using the processing device, at least one input for the at least one machine learning model based on the at least one request and the at least one information, wherein the at least one input comprises the at least one request and the at least one information;

processing, using the processing device, the at least one input using the at least one machine learning model, wherein the at least one machine learning model is configured for generating at least one output based on the at least one input, wherein the generating of the at least one output is further based on the at least one initial output;

generating, using the processing device, at least one response for the at least one request based on the processing of the at least one input;

transmitting, using the communication device, the at least one response through the conversational interaction interface for conversationally interacting with the at least one user to the at least one user device; and storing, using a storage device, the at least one machine learning model, the at least one request, and the at least one response.

2. The method of claim 1 further comprising:

analyzing, using the processing device, the at least one output; and modifying, using the processing device, the at least one output by incorporating at least one modification in the at least one output based on the analyzing of the at least one output, wherein the generating of the at least one response is further based on the modifying of the at least one output, wherein the at least one modification removes one or more words having a negative connotation from the at least one response.

3. The method of claim 1 further comprising:

analyzing, using the processing device, the at least one request;

identifying, using the processing device, at least one instruction for the at least one request based on the analyzing of the at least one request; and appending, using the processing device, the at least one instruction to the at least one request, wherein the generating of the at least one input is further based on the appending of the at least one instruction.

4. The method of claim 1, wherein the at least one machine learning model comprises at least one large language model (LLM) comprising a generative pre-trained transformer (GPT) architecture.

5. The method of claim 1, wherein the at least one machine learning model is trained using a plurality of training samples, wherein the method comprises:

retrieving, using the storage device, at least one data specific to at least one domain;

analyzing, using the processing device, the at least one data;

generating, using the processing device, at least one additional training sample for the at least one machine learning model; and tuning, using the processing device, the at least one machine learning model based the at least one additional training sample using at least one training technique, wherein the at least one machine learning model is configured for performing at least one operation for the generating of the at least one output based on the tuning.

6. The method of claim 1, wherein the at least one machine learning model is associated with at least one persona, wherein the at least one machine learning model is configured for modifying the at least one output based on the at least one persona, wherein the generating of the at least one response is further based on the modifying of the at least one output based on the at least one persona.

7. The method of claim 1 further comprising:

analyzing, using the processing device, at least one interaction with the at least one user through the conversational interaction interface, wherein the at least one interaction comprises the at least one request and the at least one response;

determining, using the processing device, at least one task for the at least one user based on the analyzing of the at least one interaction; and determining, using the processing device, at least one task information associated with the at least one task based on the determining of the at least one task, wherein the determining of the at least one task information is initiated based on at least one predefined condition, wherein the at least one predefined condition is based on at least one contextual variable, wherein the at least one contextual variable represents a condition relevant to the determining of the at least one task information, wherein the at least one contextual variable comprises a physical state of the at least one device, wherein the at least one device comprises at least one sensor for generating the physical state of the at least one user device;

analyzing, using the processing device, the at least one task information;

generating, using the processing device, at least one additional response for the at least one user based on the analyzing of the at least one task information; and transmitting, using the communication device, the at least one task information through the conversational interaction interface to the at least one user device.

8. The method of claim 1 further comprising:

analyzing, using the processing device, the at least one request; and determining, using the processing device, at least one context associated with the helping of the at least one user based on the analyzing of the at least one request, wherein the generating of the at least one output is further based on the at least one context, wherein the at least one context comprises an intent of the at least one user, wherein the at least one machine learning model dynamically adjusts at least one model parameter responsible for curating the at least one output based on the at least one context.

9. The method of claim 1 further comprising:

retrieving, using the storage device, a plurality of historical requests and a plurality of responses associated with the plurality of requests;

analyzing, using the processing device, the plurality of historical requests and the plurality of responses;

clustering, using the processing device, the plurality of historical requests and the plurality of responses in at least one cluster using at least one criterion based on the analyzing of the plurality of historical requests and the plurality of responses, wherein the at least one cluster corresponds to at least one group of the plurality of historical requests and the plurality of responses, wherein the clustering is performed using a k-means clustering;

storing, using the storage device, the at least one cluster;

analyzing, using the processing device, the at least one request and the at least one cluster; and identifying, using the processing device, at least one of the at least one cluster based on the analyzing of the at least one request and the clustering, wherein the generating of the at least one response is further based on at least one of the at least one cluster for the at least one request.

10. A system for facilitating conversational interaction with users to help the users, the system comprising:

a communication device configured for:

transmitting a conversational interaction interface for conversationally interacting with at least one user to at least one user device associated with the at least one user;

receiving at least one request of the at least one user through the conversational interaction interface from the at least one user device; and transmitting the at least one response through the conversational interaction interface for conversationally interacting with the at least one user to the at least one user device;

a processing device communicatively coupled with the communication device, wherein the processing device is configured for:

analyzing the at least one request using at least one machine learning model, wherein the at least one machine learning model is configured for generating at least one initial output based on the at least one request, wherein the at least one machine learning model is configured for querying a knowledge base using the at least one initial output as a search query;

identifying at least one information based on the at least one request, wherein the identifying of the at least one information is further based on the querying of the knowledge base using the at least one initial output, wherein the at least one information comprises at least a portion of the knowledge base;

generating at least one input for at least one machine learning model based on the at least one request and the at least one information, wherein the at least one input comprises the at least one request and the at least one information;

processing the at least one input using the at least one machine learning model, wherein the at least one machine learning model is configured for generating at least one output based on the at least one input, wherein the generating of the at least one output is further based on the at least one initial output; and generating the at least one response for the at least one request based on the processing of the at least one input; and a storage device communicatively coupled with the processing device, wherein the storage device is configured for storing the at least one machine learning model, the at least one request, and the at least one response.

11. The system of claim 10, wherein the processing device is further configured for:

analyzing the at least one output; and modifying the at least one output by incorporating at least one modification in the at least one output based on the analyzing of the at least one output, wherein the generating of the at least one response is further based on the modifying of the at least one output, wherein the at least one modification removes one or more words having a negative connotation from the at least one response.

12. The system of claim 10, wherein the processing device is further configured for:

analyzing the at least one request;

identifying at least one instruction for the at least one request based on the analyzing of the at least one request; and appending the at least one instruction to the at least one request, wherein the generating of the at least one input is further based on the appending of the at least one instruction.

13. The system of claim 10, wherein the at least one machine learning model comprises at least one large language model (LLM) comprising a generative pre-trained transformer (GPT) architecture.

14. The system of claim 10, wherein the at least one machine learning model is trained using a plurality of training samples, wherein the storage device is further configured for retrieving at least one data specific to at least one domain, wherein the processing device is further configured for:

analyzing the at least one data;

generating at least one additional training sample for the at least one machine learning model; and tuning the at least one machine learning model based the at least one additional training sample using at least one training technique, wherein the at least one machine learning model is configured for performing at least one operation for the generating of the at least one output based on the tuning.

15. The system of claim 10, wherein the at least one machine learning model is associated with at least one persona, wherein the at least one machine learning model is configured for modifying the at least one output based on the at least one persona, wherein the generating of the at least one response is further based on the modifying of the at least one output based on the at least one persona.

16. The system of claim 10, wherein the processing device is further configured for:

analyzing at least one interaction with the at least one user through the conversational interaction interface, wherein the at least one interaction comprises the at least one request and the at least one response;

determining at least one task for the at least one user based on the analyzing of the at least one interaction:

determining at least one task information associated with the at least one task based on the determining of the at least one task, wherein the determining of the at least one task information is initiated based on at least one predefined condition, wherein the at least one predefined condition is based on at least one contextual variable, wherein the at least one contextual variable represents a condition relevant to the determining of the at least one task information, wherein the at least one contextual variable comprises a physical state of the at least one device, wherein the at least one device comprises at least one sensor for generating the physical state of the at least one user device;

analyzing the at least one task information; and generating at least one additional response for the at least one user based on the analyzing of the at least one task information, wherein the communication device is further configured for transmitting the at least one task information through the conversational interaction interface to the at least one user device.

17. The system of claim 10, wherein the processing device is further configured for:

analyzing the at least one request; and determining at least one context associated with the helping of the at least one user based on the analyzing of the at least one request, wherein the generating of the at least one output is further based on the at least one context, wherein the at least one context comprises an intent of the at least one user, wherein the at least one machine learning model dynamically adjusts at least one model parameter responsible for curating the at least one output based on the at least one context.

18. The system of claim 10, wherein the storage device is further configured for:

retrieving a plurality of historical requests and a plurality of responses associated with the plurality of requests; and storing at least one cluster, wherein the processing device is further configured for:

analyzing the plurality of historical requests and the plurality of responses; and clustering the plurality of historical requests and the plurality of responses in the at least one cluster using at least one criterion based on the analyzing of the plurality of historical requests and the plurality of responses, wherein the at least one cluster corresponds to at least one group of the plurality of historical requests and the plurality of responses, wherein the clustering is performed using a k-means clustering;

analyzing the at least one request and the at least one cluster; and identifying at least one of the at least one cluster based on the analyzing of the at least one request and the clustering, wherein the generating of the at least one response is further based on at least one of the at least one cluster for the at least one request.

\* \* \* \* \*